United States Patent
Kikuchi et al.

(10) Patent No.: US 6,950,043 B2
(45) Date of Patent: Sep. 27, 2005

(54) DATA STREAM GENERATION APPARATUS AND METHOD OF SAME, VARIABLE LENGTH ENCODED DATA STREAM GENERATION APPARATUS AND METHOD OF SAME, AND CAMERA SYSTEM

(75) Inventors: Kenji Kikuchi, Kanagawa (JP); Yoshifumi Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 776 days.

(21) Appl. No.: 10/068,706

(22) Filed: Feb. 5, 2002

(65) Prior Publication Data

US 2002/0122597 A1 Sep. 5, 2002

(30) Foreign Application Priority Data

Feb. 7, 2001 (JP) ........................................ 2001-031485

(51) Int. Cl.[7] .............................................. H03M 7/00
(52) U.S. Cl. .............................. 341/60; 341/67; 341/50; 341/51
(58) Field of Search ............................ 341/60, 67, 50, 341/51; 375/240.24, 240.15, 240.23, 240; 382/233, 239; 710/305, 65; 711/200

(56) References Cited

U.S. PATENT DOCUMENTS

| | | | | |
|---|---|---|---|---|
| 4,967,196 A | * | 10/1990 | Sprague et al. ................ | 341/67 |
| 5,168,356 A | * | 12/1992 | Acampora et al. ...... | 375/240.15 |
| 5,173,695 A | * | 12/1992 | Sun et al. ...................... | 341/67 |
| 5,245,338 A | * | 9/1993 | Sun .............................. | 341/67 |
| 5,552,832 A | * | 9/1996 | Astle ....................... | 375/240.24 |
| 5,606,370 A | * | 2/1997 | Moon ..................... | 375/240.23 |
| 5,663,726 A | * | 9/1997 | Bakhmutsky ................. | 341/67 |
| 5,901,177 A | * | 5/1999 | Sohn ........................... | 375/240 |
| 5,913,229 A | * | 6/1999 | Joo ............................. | 711/200 |
| 5,961,626 A | * | 10/1999 | Harrison et al. ............ | 710/305 |
| 6,078,690 A | * | 6/2000 | Yamada et al. .............. | 382/233 |
| 6,098,129 A | * | 8/2000 | Fukuzawa et al. ............ | 710/65 |
| 6,215,424 B1 | * | 4/2001 | Cooper ......................... | 341/67 |
| 6,501,859 B1 | * | 12/2002 | Kajiwara ..................... | 382/239 |

* cited by examiner

*Primary Examiner*—Jean Bruner Jeanglaude
(74) *Attorney, Agent, or Firm*—Frommer Lawrence & Haug LLP; William S. Frommer

(57) ABSTRACT

A data stream generation apparatus and method for the JPEG etc. for efficiently performing processing for insertion of fill bits and a camera system using the same, wherein when not yet output data coupled at a data coupler reaches 32 bits, 32 bits of data are output from an MSB side of this not yet output data to an output unit and the remaining data is fed back to the data coupler, while when it does not reach 32 bits, the not yet output data is fed back to the data coupler; fill bits having a data length of a difference between a data length obtained by an addition of input data and the data length of a feedback data and the data length of a whole multiple of one byte are generated at a fill bit adder, added to the MSB side of a marker, and output to a data selection unit; and this marker or the variable length data is selected in accordance with a selection signal, coupled to an LSB side of the feedback data at the data coupler, and supplied to the output unit.

26 Claims, 17 Drawing Sheets

FIG. 9

| UN-OUTPUT DATA LENGTH LSB 3 BITS | | FILL BIT LENGTH | |
|---|---|---|---|
| DECIMAL | BINARY | DECIMAL | BINARY |
| 0 | 000 | 0 | 000 |
| 1 | 001 | 7 | 111 |
| 2 | 010 | 6 | 110 |
| 3 | 011 | 5 | 101 |
| 4 | 100 | 4 | 100 |
| 5 | 101 | 3 | 011 |
| 6 | 110 | 2 | 010 |
| 7 | 111 | 1 | 001 |

FIG. 11

| FILL BIT LENGTH | | FILL BIT LENGTH |
|---|---|---|
| DECIMAL | BINARY | |
| 0 | 000 | 7'b000_0000 |
| 1 | 001 | 7'b100_0000 |
| 2 | 010 | 7'b110_0000 |
| 3 | 011 | 7'b111_0000 |
| 4 | 100 | 7'b111_1000 |
| 5 | 101 | 7'b111_1100 |
| 6 | 110 | 7'b111_1110 |
| 7 | 111 | 7'b111_1111 |

FIG. 13

| FILL BIT LENGTH | | | | F2v | F1v | LINK SEQUENCE | FILL BIT |
|---|---|---|---|---|---|---|---|
| DECIMAL | BINARY | | | | | | |
| | F2 | F1 | F0 | | | | |
| 0 | 0 | 0 | 0 | 0000 | 00 | {F0,00,0000} | 7'b000_0000 |
| 1 | 0 | 0 | 1 | | | | 7'b100_0000 |
| 2 | 0 | 1 | 0 | | 11 | {11,F0,0000} | 7'b110_0000 |
| 3 | 0 | 1 | 1 | | | | 7'b111_0000 |
| 4 | 1 | 0 | 0 | 1111 | 00 | {1111,F0,00} | 7'b111_1000 |
| 5 | 1 | 0 | 1 | | | | 7'b111_1100 |
| 6 | 1 | 1 | 0 | | 11 | {1111,11,F0} | 7'b111_1110 |
| 7 | 1 | 1 | 1 | | | | 7'b111_1111 |

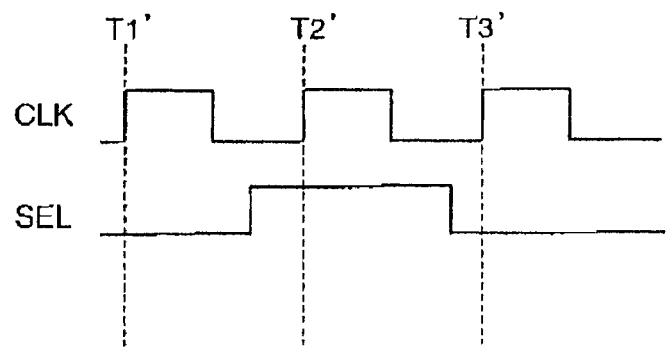
FIG. 16A CLK
FIG. 16B SEL

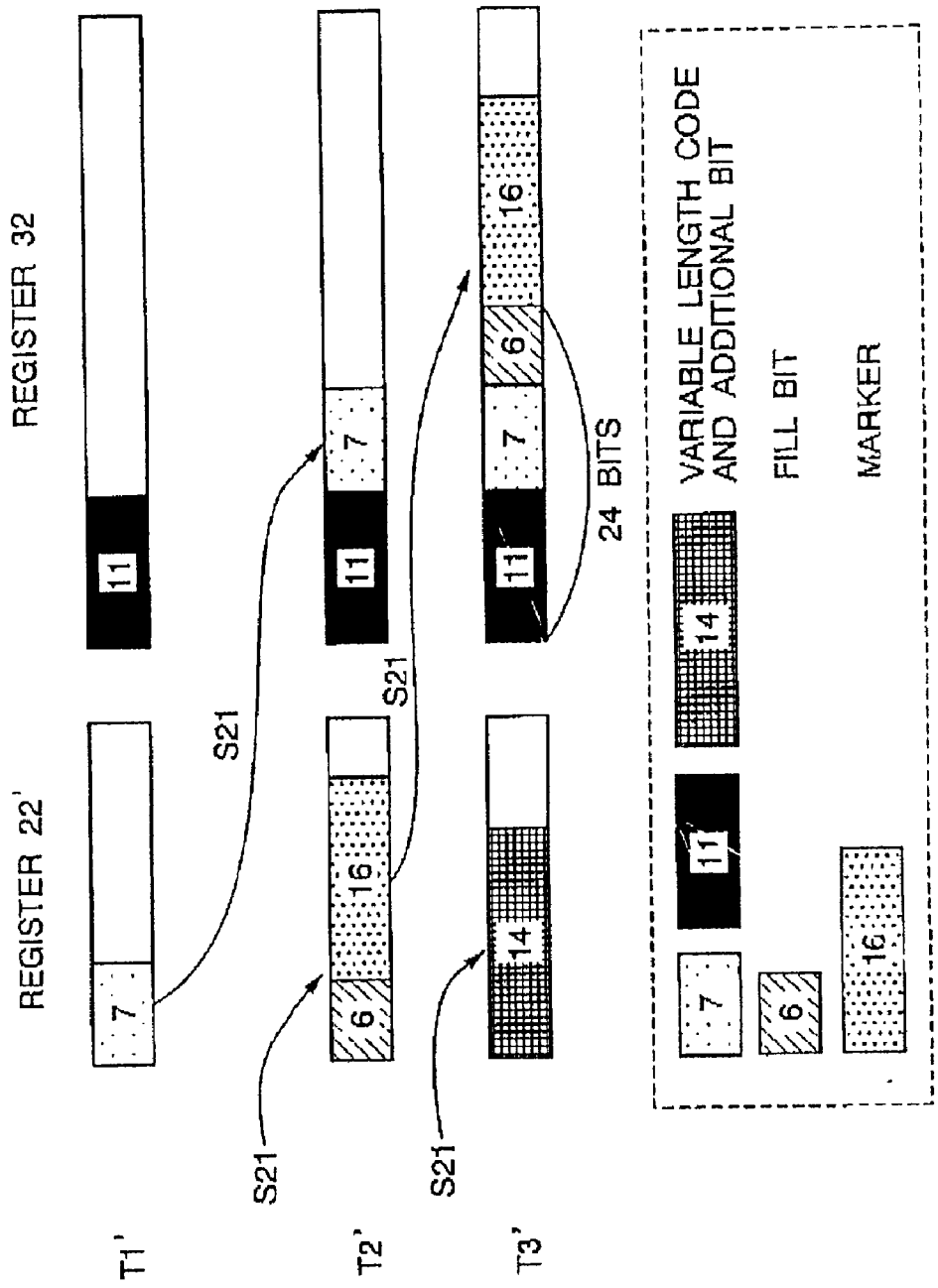

DATA STREAM GENERATION APPARATUS AND METHOD OF SAME, VARIABLE LENGTH ENCODED DATA STREAM GENERATION APPARATUS AND METHOD OF SAME, AND CAMERA SYSTEM

BACKGROUND OF THE INVENTION

1. Field of the Invention

The present invention relates to a data stream generation apparatus for generating a data stream of a predetermined data length from an input data stream and a method of the same. The present invention also relates to a variable length data stream generation apparatus for applying such an apparatus and method to variable length encoding, for example, JPEG, to generate a predetermined data stream and a method of the same. The present invention further relates to a camera system for variably encoding and processing a signal of a picked up image.

2. Description of the Related Art

There are various schemes for encoding image data, audio data, etc. The JPEG (Joint Photographic Experts Group) scheme is a typical example which is widely used when encoding still images.

In the JPEG, various control codes referred to as markers are used in order to define the structure of a compressed and encoded bit stream.

For example, in the encoding scheme using a discrete cosine transform (DCT) employed in the JPEG, the amount of information is reduced by encoding DC components of DCT coefficients having a high correlation among blocks by a differential value between adjoining blocks. For this reason, when an error occurs in the data due to some cause or another when transferring the JPEG compressed and encoded data, there is a great effect upon the later following blocks. In order to prevent this, in JPEG image data, a marker referred to as a "restart marker" (RSTm) for clearing the held DC component values is inserted into the bit stream for every set of blocks of for example 8×8 pixels, that is, every unit referred to as a minimum coded unit (MCU).

There are also markers such as the start-of-image (SOI) marker indicating the start of one image and the end-of-image (EOI) marker indicating the end of the image. These markers are allocated 2-byte codes having 1-byte headers expressed by FFh (h indicates a hexadecimal notation). For example, the codes FFD0h to FFD7h are allocated to the RSTm, a code FFD8h is allocated to the SOI, and a code FFD9h is allocated to the EOI.

In the JPEG, these markers are required to be inserted at suitable locations relative to a border of byte units in the compressed and encoded bit stream. However, since the compression and encoding of the JPEG is variable length encoding, if the markers are inserted into the compressed and encoded bit stream as they are, the insertion locations of the markers relative to the byte borders will not become constant.

Therefore, when inserting markers into a compressed and encoded bit stream, it is necessary to generate bit data having a suitable data length for adjusting the insertion locations (referred to as fill bits) and insert these before the markers.

Summarizing the disadvantages discussed above, when generating a stream of the image data compressed and encoded by for example the JPEG, it is necessary to insert various markers into the bit stream generated by the compression and encoding, generate fill bits, and insert them before the markers at every insertion of the markers. Such processing requires complex control, so such processing has been conventionally carried out by software. However, the software includes many processing routines requiring many execution cycles, for example, processing of bit shifting and connecting the data. Further, the image data becomes huge in many cases. Therefore it suffers from the disadvantage that a practical processing speed is difficult to obtain with software.

Also, even when such processing is realized by hardware, it suffers from the disadvantages in that the configuration is complex and the size of the circuit becomes great. This becomes a problem particularly when such a circuit is to be formed in an LSI. Improvement has therefore been desired.

SUMMARY OF THE INVENTION

An object of the present invention is to provide a data stream generation apparatus for generating a data stream of a predetermined data length from sequentially input data streams with a smaller circuit scale and simple configuration and control by efficiently performing the processing for insertion of the fill bits and a method of the same.

Another object of the present invention is to provide a variable length encoded data stream generation apparatus for variable length encoding intended data to generate a predetermined data stream with a smaller circuit scale and simple configuration and control by efficiently performing the processing for insertion of the fill bits and a method of the same.

Still another object of the present invention is to provide a camera system for picking up (taking) an intended image and compressing and encoding the picked up image data, particularly a camera system for generating an image data stream obtained by variable length encoding the picked up image data with a smaller circuit scale and simpler configuration and control.

According to a first aspect of the present invention, there is provided a data stream generation apparatus for sequentially coupling predetermined header bits of sequentially input data to a tail bit side of previously input data and sequentially outputting data having a predetermined data length from the header bit side of the coupled data, the data stream apparatus comprising a data outputting means for outputting the predetermined data length's worth of data from the header bit side of the not yet output data and outputting data remaining after the output as feedback data when the data length of the coupled data which has not been output reaches the predetermined data length and for outputting the not yet output data as the feedback data when the data length of the not yet output data does not reach the predetermined data length, a data adding means for generating adjustment data having a data length of a difference between the data length of the feedback data and a data length of a whole multiple of a predetermined unit data length when the input data is the predetermined data and adding the same to the tail bit side of the feedback data, and a data coupling means for coupling the header bit of the input data to the tail bit side of the feedback data and supplying the coupled data as the not yet output data to the data outputting means.

According to the data stream generation apparatus of the first aspect of the present invention, when the data length of the coupled data which has not been output reaches the predetermined data length, the predetermined data length worth's of data is output from the header bit side of the not yet output data from the data outputting means and the data remaining after the output is output as the feedback data. Also, when the data length of the not yet output data does not reach the predetermined data length, the not yet output data is output as the feedback data from the data outputting means.

When the input data is predetermined data, the data adding means generates adjustment data having the data length of the difference between the data length of the feedback data and the data length of a whole multiple of a predetermined unit data length and adds it to the tail bit side of the feedback data.

The data coupling means couples the header bit of the input data to the tail bit side of the feedback data and supplies, the coupled data as the not yet output data to the data outputting means.

Also, the apparatus has a data length processing means for cumulatively adding the data length of the input data based on the input data length information sequentially input corresponding to the input data, subtracting the predetermined data length from the cumulative data length when the cumulative data length reaches the predetermined data length, and adding the data length of the adjustment data to the cumulative data length when the input data is control data, and the data output unit outputs the data of the predetermined data length when the cumulative data length of the data length processing means reaches the predetermined data length, while outputs the not yet output data as the feedback data when it does not reach the predetermined data length.

Also, the data adding means includes an adjustment data length setting means for setting an adjustment data length in accordance with the cumulative data length of the data length processing means when the input data is predetermined data, an adjustment data generating means for generating the adjustment data in accordance with the set adjustment data length, and an adding means for adding the generated adjustment data to the tail bit side of the feedback data, and the data length processing means adds the set adjustment data length to the cumulative data length when the input data is predetermined data.

According to a second aspect of the present invention, there is provided a data stream generation apparatus for sequentially coupling predetermined header bits of sequentially input data to a tail bit side of previously input data and sequentially outputting data having a predetermined data length from the header bit side of the coupled data, the data stream generation apparatus comprising a data outputting means for outputting the predetermined data length's worth of the data from the header bit side of the not yet output data and outputting data remaining after the output as feedback data when the data length of the coupled data which has not been output reaches the predetermined data length and outputting the not yet output data as the feedback data when the data length of the not yet output data does not reach the predetermined data length, a data adding means for generating adjustment data having a data length of a difference between a sum of data lengths of the input data and the feedback data and the data length of a whole multiple of a predetermined unit data length and adding the same to the header bit side of the input predetermined data, a data selecting means for selecting predetermined data with the adjustment data added thereto or other input data in accordance with a supplied selection signal, and a data coupling means for coupling the header bit of the selected input data to the tail bit side of the feedback data and supplying the coupled data as the not yet output data to the data outputting means.

According to the data stream generation apparatus according to the second aspect of the present invention, when the data length of the coupled data which has not been output reaches the predetermined data length, the predetermined data length worth's of data is output from the header bit side of the not yet output data from the data outputting means, and data remaining after the output is output as the feedback data. When the data length of the not yet output data does not reach the predetermined data length, the not yet output data is output as the feedback data from the data outputting means.

The data adding means generates adjustment data having the data length of the difference between the sum of data lengths of the input data and the feedback data and the data length of a whole multiple of a predetermined unit data length and adds it to the header bit side of the input predetermined data.

The data selecting means selects predetermined data with the adjustment data added thereto or other input data in accordance with the supplied selection signal.

The data coupling means couples the header bit of the selected input data to the tail bit side of the feedback data and supplies the coupled data as the not yet output data to the data outputting means.

Also, the apparatus has a data length processing means for cumulatively adding data lengths of the input data based on the input data length information sequentially input corresponding to the input data and subtracting the predetermined data length from the cumulative data length when the cumulative data length reaches the predetermined data length, and the data output unit outputs the data of the predetermined data length when the cumulative data length of the data length processing means reaches the predetermined data length, while outputs the not yet output data as the feedback data when it does not reach the predetermined data length.

Also, the data adding means includes an adjustment data length setting means for setting an adjustment data length in accordance with the sum of the cumulative data length of the data length processing means and the input data length, an adjustment data generating means for generating the adjustment data in accordance with the set adjustment data length, and an adding means for adding the generated adjustment data to the header bit side of the control data.

According to a third aspect of the present invention, there is provided a data stream generation method for sequentially coupling predetermined header bits of sequentially input data to the tail bit side of previously input data and sequentially outputting data of the predetermined data length from the header bit side of the coupled data, the data stream generation method repeating the following steps: a data outputting step of outputting the predetermined data length's worth of data from the header bit side of the not yet output data and generating feedback data in accordance with the data remaining after the output when the data length of the coupled data which has not been output reaches the predetermined data length, or generating the feedback data in accordance with the not yet output data when the data length of the not yet output data does not reach the predetermined data length, a data adding step of generating adjustment data having the data length of the difference between the data length of the feedback data and the data length of a whole multiple of a predetermined unit data length when the input data is predetermined data and adding the same to the tail bit side of the feedback data, and a data coupling step of coupling the header bit of the input data to the tail bit side of the feedback data and generating the not yet output data of the data output step.

According to a fourth aspect of the present invention, there is provided a data stream generation method for sequentially coupling predetermined header bits of sequentially input data to the tail bit side of previously input data and sequentially outputting data of a predetermined data length from the header bit side of the coupled data, the data stream generation method repeating the following steps: a data outputting step of outputting the predetermined data length's worth of the data from the header bit side of the not yet output data and generating feedback data in accordance with the data remaining after the output when the data length of the coupled data which has not been output reaches the predetermined data length and generating the feedback data in accordance with the not yet output data when the data length of the not yet output data does not reach the predetermined data length and a data coupling step of generating adjustment data having a data length of a difference between a sum of data lengths of the input data and the feedback data and the data length of a whole multiple of a predetermined unit data length, adding the same to the header bit side of the input predetermined data, selecting predetermined data with the adjustment data added thereto or sequentially input variable length data in accordance with an input selection signal, and coupling the header bit of the selected data to the tail bit side of the feedback data.

According to a fifth aspect of the present invention, there is provided a variable length encoded data stream generation apparatus for sequentially generating variable length encoded data or predetermined control data, sequentially coupling predetermined header bits of the generated data to the tail bit side of previously generated data, and sequentially outputting data of a predetermined data length from the header bit side of the coupled data, the variable length encoded data stream generation apparatus comprising a variable length encoding means for sequentially generating variable length encoded data obtained by compressing and encoding intended data or intended control data, a data outputting means for outputting the predetermined data length's worth of data from the header bit side of the not yet output data and outputting data remaining after the output as feedback data when the data length of the coupled data which has not been output reaches the predetermined data length, while outputting the not yet output data as the feedback data when the data length of the not yet output data does not reach the predetermined data length, a data adding means for generating adjustment data having a data length of a difference between the data length of the feedback data and the data length of a whole multiple of a predetermined unit data length when the generated data of the variable length encoding means is the control data and adding the same to the tail bit side of the feedback data, and a data coupling means for coupling the header bit of the generated data of the variable length encoding means to the tail bit side of the feedback data and supplying the coupled data as the not yet output data to the data outputting means.

According to a sixth aspect of the present invention, there is provided a variable length encoded data stream generation apparatus for sequentially generating variable length encoded data or predetermined control data, sequentially coupling predetermined header bits of the generated data to the tail bit side of the previously generated data, and sequentially outputting data of the predetermined data length from the header bit side of the coupled data, the variable length encoded data stream generation apparatus comprising a variable length encoding means for sequentially generating variable length encoded data obtained by compressing and encoding intended data or intended control data and outputting a selection signal in accordance with the generated data, a data outputting means for outputting the predetermined data length's worth of data from the header bit side of the not yet output data and outputting data remaining after the output as feedback data when the data length of the coupled data which has not been output reaches the predetermined data length, while outputting the not yet output data as the feedback data when the data length of the not yet output data does not reach the predetermined data length, a data adding means for generating adjustment data having a data length of a difference between a sum of data lengths of the input data and the feedback data and the data length of a whole multiple of a predetermined unit data length and adding the same to the header bit side of the control data, a data selecting means for selecting control data with the adjustment data added thereto or the variable length encoded data in accordance with the selection signal, and a data coupling means for coupling the header bit of the selected data of the data selecting means to the tail bit side of the feedback data and supplying the coupled data as the not yet output data to the data outputting means.

According to a seventh aspect of the present invention, there is provided a variable length encoded data stream generation method for sequentially generating variable length encoded data or predetermined control data, sequentially coupling the predetermined header bits of the generated data to the tail bit side of the previously generated data, and sequentially outputting data of a predetermined data length from the header bit side of the coupled data, the variable length encoded data stream generation method repeating the following steps: a variable length encoding step of sequentially generating variable length encoded data obtained by variable length encoding the intended data or intended control data, a data outputting step of outputting the predetermined data length's worth of data from the header bit side of the not yet output data and generating feedback data in accordance with the data remaining after the output when the data length of the coupled data which has not been output reaches the predetermined data length and generating the feedback data in accordance with the not yet output data when the data length of the not yet output data does not reach the predetermined data length, a data adding step of generating adjustment data having a data length of a difference between the data length of the feedback data and the data length of a whole multiple of a predetermined unit data length when the generated data in the variable length encoding step is the control data and adding the same to the tail bit side of the feedback data, and a data coupling step of coupling the header bit of the generated data to the tail bit side of the feedback data and generating the not yet output data of the data output step.

According to an eighth aspect of the present invention, there is provided a variable length encoded data stream generation method for sequentially generating variable length encoded data or predetermined control data, sequentially coupling predetermined header bits of the generated data to the tail bit side of the previously generated data, and sequentially outputting the predetermined data length' worth of data from the header bit side of the coupled data, the variable length encoded data stream generation method repeating the following steps: a variable length encoding step of sequentially generating variable length encoded data obtained by variable length encoding the intended data or intended control data and generating a selection signal in accordance with the generated data, a data outputting step of outputting the predetermined data length's worth of data from the header bit side of the not yet output data and generating feedback data in accordance with the data remaining after output when the data length of the coupled data which has not been output reaches the predetermined data length and generating the feedback data in accordance with the not yet output data when the data length of the not yet output data does not reach the predetermined data length, and a data coupling step of generating adjustment data having a data length of the difference between the sum of data lengths of the input data and the feedback data and the data length of a whole multiple of a predetermined unit data length and adding the same to the header bit side of the control data, selecting the control data with the adjustment data added thereto or sequentially input variable length data in accordance with the selection signal, and coupling the header bit of the selected data to the tail bit side of the feedback data.

According to a ninth aspect of the present invention, there is provided a camera system for sequentially generating data obtained by variable length encoding image data or predetermined control data, sequentially coupling predetermined header bits of the generated data to the tail bit side of previously generated data, and sequentially outputting data of a predetermined data length from the header bit side of the coupled data, the camera system comprising an imaging means for imaging a desired image and generating image data, a variable length encoding means for sequentially generating variable length encoded data obtained by variable length encoding the generated image data or desired control data, a data outputting means for outputting the predetermined data length's worth of data as output image data from the header bit side of the not yet output data and outputting data remaining after the output as feedback data when the data length of the coupled data which has not been output reaches the predetermined data length, while outputting the not yet output data as the feedback data when the data length of the not yet output data does not reach the predetermined data length, a data adding means for generating adjustment data having a data length of the difference between the data length of the feedback data and the data length of a whole multiple of a predetermined unit data length and adding the same to the tail bit side of the feedback data when the generated data of the variable length encoding means is the control data, a data coupling means for coupling the header bit of the generated data of the variable length encoding means to the tail bit side of the feedback data and supplying the coupled data as the not yet output data to the data outputting means, and a processing means for performing predetermined processing with respect to the stream of the output image data.

According to a 10th aspect of the present invention, there is provided a camera system for sequentially generating data obtained by variable length encoding image data or predetermined control data, sequentially coupling predetermined header bits of the generated data to the tail bit side of previously generated data, and sequentially outputting data of a predetermined data length from the header bit side of the coupled data, the camera system comprising an imaging means for imaging the desired image and generating image data, a variable length encoding means for sequentially generating variable length encoded data obtained by variable length encoding the generated image data or intended control data and outputting a selection signal in accordance with the generated data, a data outputting means for outputting the predetermined data length's worth of data as output image data from the header bit side of the not yet output data and outputting data remaining after the output as feedback data when the data length of the coupled data which has not been output reaches the predetermined data length, while outputting the not yet output data as the feedback data when the data length of the not yet output data does not reach the predetermined data length, a data adding means for generating adjustment data having a data length of the difference between the sum of data lengths of the input data and the feedback data and the data length of a whole multiple of a predetermined unit data length and adding the same to the header bit side of the control data, a data selecting means for selecting control data with the adjustment data added thereto or the variable length encoded data in accordance with the selection signal, a data coupling means for coupling the header bit of the selected data of the data selecting means to the tail bit side of the feedback data and supplying the coupled data as the not yet output data to the data outputting means, and a processing means for performing predetermined processing with respect to the stream of the output image data.

BRIEF DESCRIPTION OF THE DRAWINGS

These and other objects and features of the present invention will become clearer from the following description of the preferred embodiments given with reference to the accompanying drawings, in which:

FIG. 9 is a view showing an example of correspondence between a not yet output data length and a fill bit length;

FIG. 11 is a view showing an example of correspondence between the fill bit length and the fill bits;

FIG. 13 is a view showing an example of correspondence between the fill bits generated by the fill bit generator shown in FIG. 12 and the fill bit length;

FIG. 16 is a timing chart showing an example of the timing of the selection signal with respect to the system clock; and FIG. 17 is a view showing an example of the data held in each register at each time of the timing chart shown in FIG. 16.

DESCRIPTION OF THE PREFERRED EMBODIMENTS

First Embodiment

A first embodiment according to the present invention will be explained by referring to FIG. 1 to FIG. 13.

In the present embodiment, the present invention will be explained by illustrating a camera system for picking up (taking) a still image, compressing and encoding the same, and recording this, for example, an electronic still camera.

[Camera System]

First, an explanation will be made of the overall configuration and operation of the camera system by referring to FIG. 1.

Figure 1:
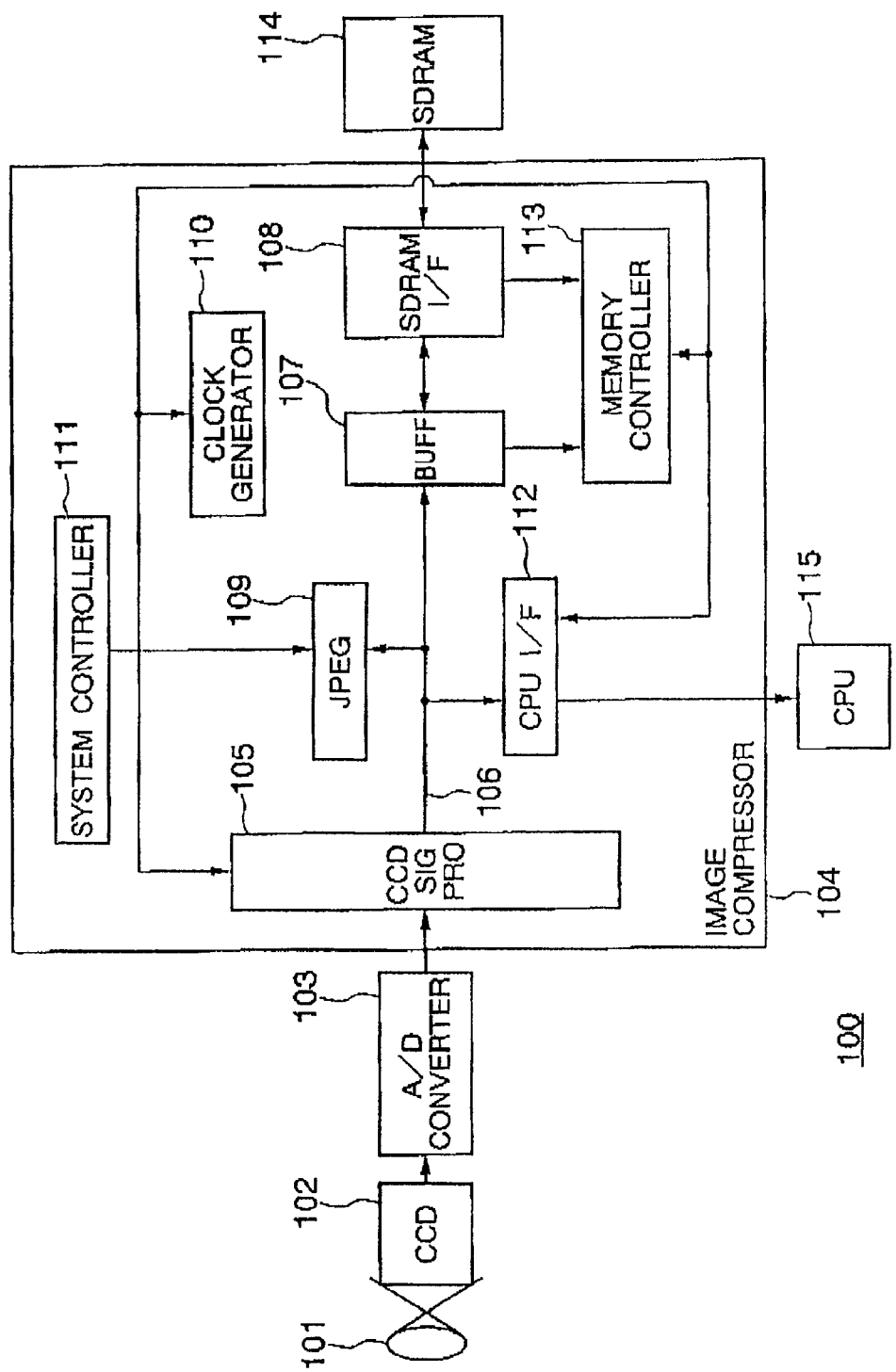
FIG. 1 is a schematic view of the configuration for explaining a camera system of a first embodiment according to the present invention.

FIG. 1 is a schematic view of the configuration for explaining a camera system 100 of the first embodiment according to the present invention. The camera system 100 has an optical system 101, charge coupled device (CCD) 102, analog/digital (A/D) converter 103, image compressor 104, static dynamic random access memory (SDRAM) 114, and central processing unit (CPU) 115.

Also, the image compressor 104 has a CCD signal processor 105, bus 106, buffer 107, SDRAM interface (SDRAM I/F) 108, JPEG processor 109, clock generator 110, system controller 111, CPU interface (CPU I/F) 112, and memory controller 113.

The optical system 101 picks up (takes) the desired image by operation of the user and focuses the optical signal thereof on an imaging surface of the CCD 102.

The CCD 102 converts the optical signal on the imaging surface focused by the optical system 101 to an electric signal and outputs the same as an analog image signal to the A/D converter 103.

The A/D converter 103 converts the analog image signal input from the CCD 102 to a digital signal of a predetermined gradation and outputs this to the CCD signal processor 105 of the image compressor 104.

The CCD signal processor 105 of the image compressor 104 decomposes the input digital image signal to color signals of R (red), G (green), and B (blue) under the control of the system controller 111, performs gamma correction for a color reproducibility with respect to the color signals, and further generates a luminance signal and a color deviation signal. The image signal comprised by the generated luminance signal and color deviation signal is output via the bus 106 to the buffer 107.

The buffer 107 sequentially stores the image signal input from the CCD signal processor 105 via the bus 106 and, when a constant amount is accumulated, outputs this to the SDRAM I/F 108 under the control of the memory controller 113. Also, it temporarily stores the image data which is input from the SDRAM I/F 108 and read from the SDRAM 114 and outputs this via the bus 106 to the JPEG processor 109.

The SDRAM I/F 108 is an external memory of the image compressor 104 and stores the image data for every predetermined unit input from the buffer 107 in the SDRAM 114 under the control of the memory controller 113. Also, it reads the image data stored in the SDRAM 114 in units of data blocks each consisting of 8×8 pixels and outputs this to the buffer 107.

The JPEG processor 109 JPEG encodes the image signal read from the SDRAM 114 and input via the buffer 107 under the control of the system controller 111, generates an encoded bit stream, and outputs the same via the bus 106 and the CPU I/F 112 to the CPU 115. A detailed explanation will be made of the configuration and operation of this JPEG processor 109 later.

The clock generator 110 generates a clock to be used at parts of the image compressor 104 under the control of the system controller 111 and provides it to those components.

The bus 106 is schematically illustrated as a data bus in the image compressor 104. This bus 106 is used for transfer of the image data from the CCD signal processor 105 to the buffer 107 and from the buffer 107 to the JPEG processor 109, the transfer of the encoded bit stream from the JPEG processor 109 to the CPU I/F 112, etc.

The system controller 111 operates under the control of the CPU 115 and controls the configuration units of the image compressor 104 so that the operations of the image compressor 104, that, is the storage of the input image data into the SDRAM 114, the transfer of the image data stored in the SDRAM 114 to the JPEG processor 109, the JPEG encoding in the JPEG processor 109, the output of the encoded image data to the CPU 115, etc. are suitably executed.

The CPU I/F 112 is an interface with the CPU 115 and performs the input of the control signal from the CPU 115 and the image signal, the output of the control signal to the CPU 115 and the encoded data, and so on.

The memory controller 113 controls the buffer 107 and the SDRAM I/F 108 under the control of the system controller 111 and controls the storage of the image data into the SDRAM 114, the read out of the image data stored in the SDRAM 114, and so on.

The SDRAM 114 is a memory for temporarily storing the picked up image data comprised by the luminance signal and color deviation signal. The image data picked up at the optical system 101 to A/D converter 103 is once stored in the SDRAM 114, then sequentially supplied to the JPEG processor 109, encoded, and output to the CPU 115 to be used for storage, display, transmission, etc.

The CPU 115 controls the components in the camera system 100 so that the processings by the optical system 101 to image compressor 104 and SDRAM 114 such as the picking up of the intended image, image processing, storage and reproduction of the image data, JPEG encoding, and the storage, display, and transmission of the JPEG encoded data are suitably carried out and the camera system 100 performs the intended operation as a whole.

In the camera system 100 having such a configuration, first, when the desired image is picked up by the optical system 101 by an operation of the user, the optical signal is converted to an electric signal at the CCD 102 to generate the image signal. The image signal is converted from an analog signal to a digital signal at the A/D converter 103, and further decomposed into color signals at the CCD signal processor 105 of the image compressor 104, subjected to gamma correction, and then converted to an image signal comprised by a luminance signal and a color deviation signal.

This image signal is once stored in the SDRAM 114 via the buffer 107 and the SDRAM I/F 108, then sequentially read out for every data block of 8×8 pixels and input to the JPEG processor 109.

The JPEG processor 109 encodes the image data for every sequentially input block, generates a JPEG encoded data stream of a predetermined format, outputs this via the CPU I/F 112 to the CPU 115, and performs processing such as the storage, display, and transmission.

[JPEG Processor]

Next, an explanation will be made of the internal configuration of the JPEG processor 109 of the camera system 100 and the operation thereof by referring to FIG. 2 and FIG. 3.

Figure 2:
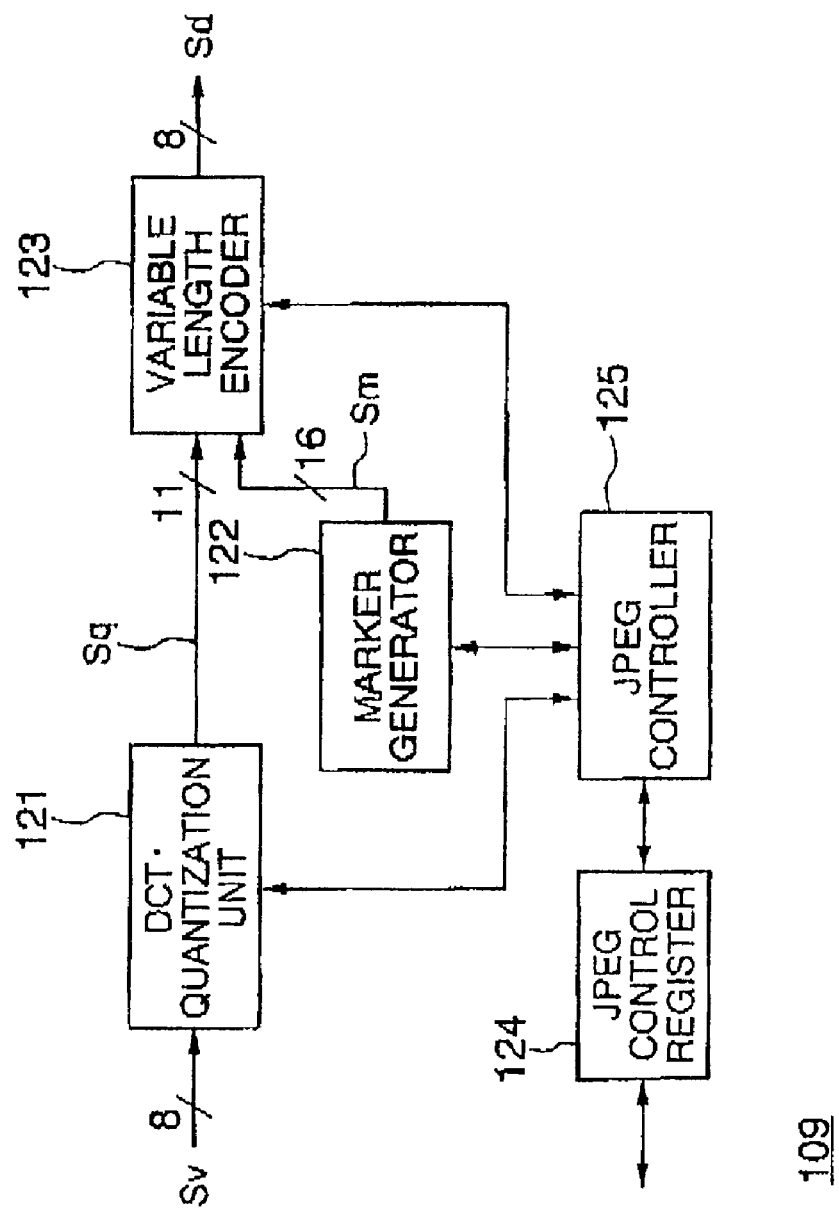
FIG. 2 is a schematic view of the configuration for explaining a JPEG processor of the camera system shown in FIG. 1.

FIG. 2 is a block diagram of the configuration of the JPEG processor 109.

The JPEG processor 109 has a DCT and quantization unit 121, marker generator 122, variable length encoder 123, JPEG control register 124, and JPEG controller 125.

Note that, it is assumed that an 8-bit pixel luminance signal and an 8-bit pixel color deviation signal are input to the JPEG processor 109 in units of 8×8 pixels.

The DCT and quantization unit 121 applies DCT to the input 8×8 pixel image data Sv to transform it to 64 frequency components (DCT coefficients) and quantizes the coefficients by using corresponding values of a not illustrated quantized table. Quantized DCT coefficients Sq (11 bits) are output to the variable length encoder 123.

The marker generator 122 generates a marker Sm to be added to the JPEG bit stream for clearly expressing the structure of the bit stream under the control of the JPEG controller 125 and outputs the same to the variable length encoder 123.

The variable length encoder 123 variable length encodes the DCT coefficients Sq input from the DCT and quantization unit 121, transforms the obtained variable length encoded data and additional bit data and the marker Sm input from the marker generator 122 to an 8-bit unit encoded bit stream Sd, and outputs the same from the JPEG processor 109.

Figure 3:
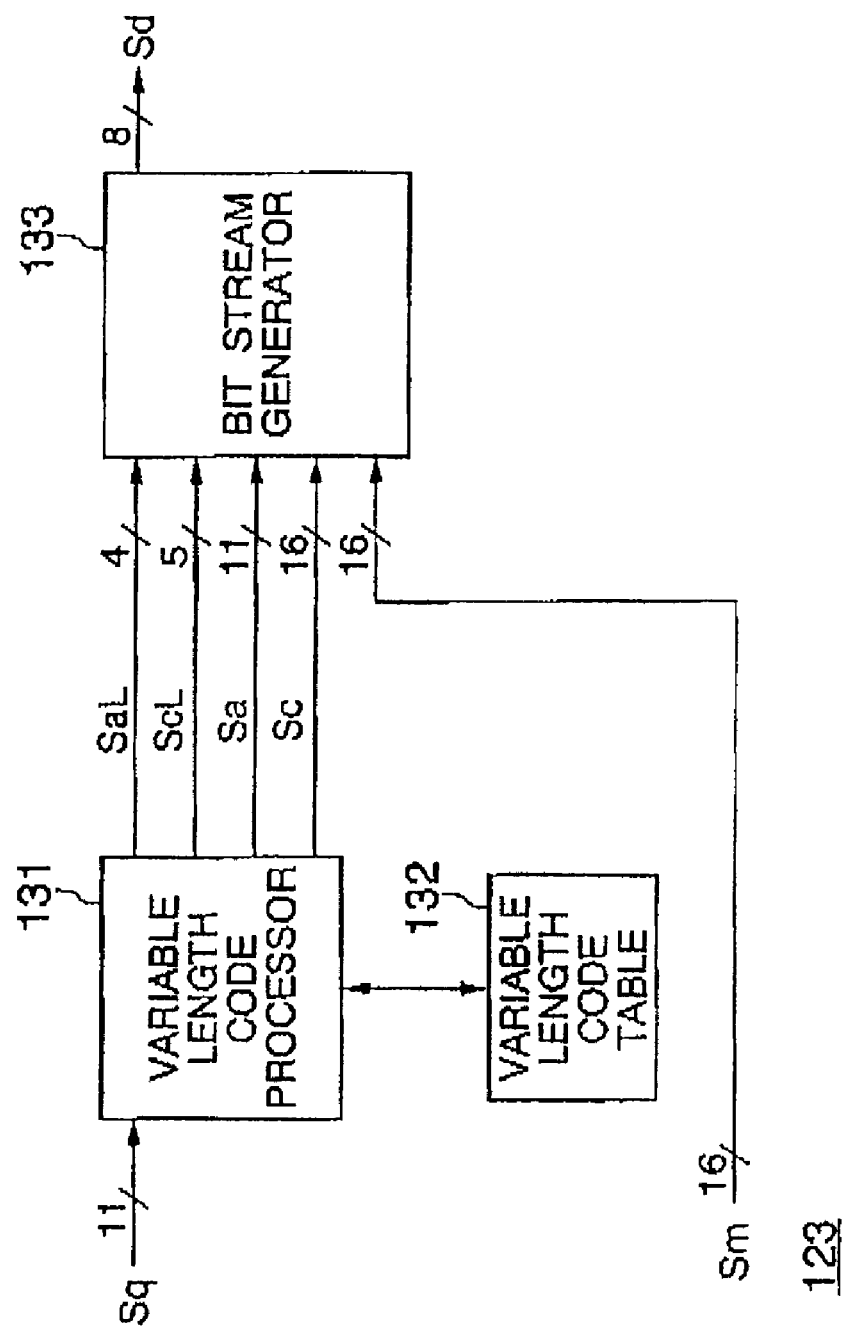
FIG. 3 is a schematic view of the configuration for explaining a variable length encoder of the JPEG processor shown in FIG. 2.

The configuration of this variable length encoder 123 is shown in FIG. 3.

FIG. 3 is a block diagram of the configuration of the variable length encoder 123.

The variable length encoder 123 has a variable length code processor 131, variable length code table 132, and bit stream generator 133.

The variable length code processor 131 detects the variable length encoded data corresponding to the magnitude of the DCT coefficients and the code length data of the variable length encoded data by referring to the variable length code table 132 based on the quantized DCT coefficients Sq input from the DCT and quantization unit 121. Also, it detects the additional bit data and the data length data of the additional bit data from the magnitude of the DCT coefficients. These detected variable length encoded data Sc, additional bit data Sa, variable length encoded data length data ScL, and additional bit data length data SaL are output to the bit stream generator 133.

Note that the variable length encoded data Sc is data of 2 to 16 bits, and the additional bit data Sa is data of 0 to 11 bits. Accordingly, each data length becomes data of 5 bits and 4 bits.

The variable length code table 132 is an encoding table for the variable length encoding.

The bit stream generator 133 transforms the variable length data input from the variable length code processor 131, that is, the variable length encoded data Sc and the additional bit data Sa, to one stream of data having an 8-bit fixed length by referring to the variable length encoded data length data ScL and the additional bit data length data SaL similarly input from the variable length code processor 131 and further adds the marker Sm input from the marker generator 122 and outputs the result as an encoded bit stream Sd.

The JPEG control register 124 of the JPEG processor 109 is a register set with the data, parameters, etc. for controlling operations of the DCT and quantization unit 121 and the variable length encoder 123 and is set by the CPU 115 via the CPU I/F 112.

The JPEG controller 125 controls the operations of the DCT and quantization unit 121, marker generator 122, and variable length encoder 123 so that processings of the DCT, quantization, marker generation, variable length encoding, bit stream generation, etc. are suitably carried out based on the data, parameters, etc. set in the JPEG control register 124.

In the JPEG processor 109 having such a configuration, operation conditions etc. are set in the JPEG control register 124 from the CPU 115. Due to this, the DCT and quantization unit 121 and the variable length encoder 123 are controlled by the JPEG controller 125 to perform processing.

Namely, the image data Sv for every sequentially input 8×8 pixels is subjected to DCT and quantized at the DCT and quantization unit 121.

The quantized DCT coefficients Sq are variable length encoded at the variable length code processor 131 of the variable length encoder 123 to generate the variable length encoded data Sc and the additional bit data Sa.

Then, these variable length data, that is, the variable length encoded data Sc and additional bit data Sa, are transformed to a stream of data having an 8-bit fixed length at the bit stream generator 133 and output as the JPEG encoded data stream Sd.

[Bit Stream Generator]

Next, a detailed explanation will be given of the bit stream generator 133 of the variable length encoder 123 according to the present invention in a JPEG processor 109 by referring to FIG. 4 to FIG. 13.

First, an explanation will be made of the configuration of the bit stream generator 133 shown in FIG. 4.

Figure 4:
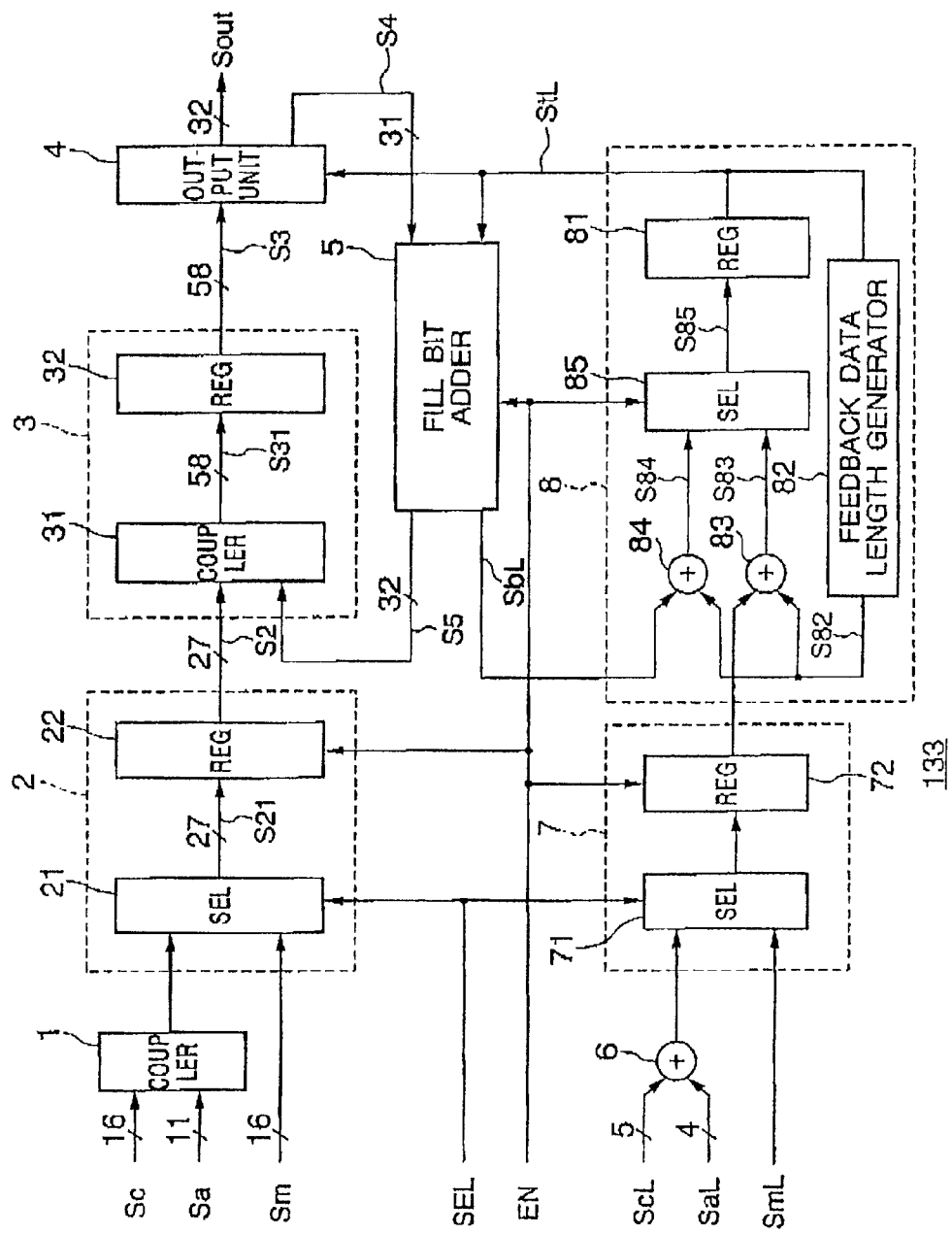
FIG. 4 is a schematic view of the configuration for explaining the configuration of a bit stream generator of the variable length encoder shown in FIG. 3.

FIG. 4 is a schematic view of the configuration for explaining the bit stream generator 133 of the variable length encoder 123.

The bit stream generator 133 has a coupler 1, data selection unit 2, data coupler 3, output unit 4, fill bit adder 5, data length adder 6, data length selection unit 7, and data length processor 8.

Note that the coupler 1 is an embodiment of the variable length data coupling means of the present invention.

The data selection unit 2 is an embodiment of the data selecting means of the present invention.

The data coupler 3 is an embodiment of the data coupling means of the present invention.

The output unit 4 is an embodiment of the data outputting means of the present invention.

The fill bit adder 5 is an embodiment of the data adder of the present invention.

The data length adder 6 is an embodiment of the data length generating means of the present invention.

The data length selection unit 7 is an embodiment of the data length selecting means of the present invention.

The data length processor 8 is an embodiment of the data length processing means of the present invention.

The coupler 1 couples 16 bits of the variable length encoded data Sc and 11 bits of the additional bit data Sa input from the variable length code processor 131 to generate 27 bits of data and outputs the same to the data selection unit 2.

These 27 bits of coupled data are generated by for example a not illustrated shift circuit and OR circuit included in the coupler 1 so that a state where the variable length encoded data Sc and the additional bit data Sa are filled to the MSB side is exhibited. In this case, the bit shift set in the shift circuit is set based on the information (variable length encoded data length data ScL or additional bit data length data SaL) of the data length input synchronous to the data.

For example, when the variable length encoded data Sc and the additional bit data Sa both input as the data filled to the MSB side are coupled filled to the MSB side so that the variable length encoded data Sc occupies the upper significant bits, first, the shift circuit bit shifts the additional bit data Sa to the LSB side by exactly the variable length encoded data length data ScL. Next, this shift data and the variable length encoded data Sc filled to the MSB are combined by the OR circuit. By this, 27 bits of the coupled data filled to the MSB side are generated.

The data selection unit 2 is a circuit block for selecting 27 bits of coupled data S21 obtained by coupling the variable length encoded data Sc and the additional bit data Sa at the coupler 1 or 16 bits of the marker Sm in accordance with a selection signal SEL and outputting the same to the data coupler 3. It has a selector 21 and register 22 in the example of FIG. 4.

The selector 21 selects 27 bits of the coupled data by the coupler 1 or the marker Sm in accordance with the selection signal SEL and outputs the same to the data coupler 3.

Also, the register 22 holds the data S21 selected at the selector 21 synchronous to a not illustrated predetermined system clock and outputs the same to the data coupler 3. Note, when the enable signal EN becomes invalid, it suspends the input of new data from the selector 21.

The data coupler 3 is a circuit block for coupling 27 bits of data S2 selected at the data selection unit 2 and data S5 fed back from the fill bit adder 5 to generate 58 bits of coupled data and outputting this to the output unit 4. It has a coupler 31 and register 32 in the example of FIG. 4.

The coupler 31 couples 27 bits of data S22 selected at the data selection unit 2 and the data S5 fed back from the fill bit adder 5 to generate 58 bits of coupled data and outputs this to the register 32.

These 58 bits of coupled data are generated by for example a not illustrated shift circuit and OR circuit included in the coupler 31 so that a state where the data S22 from the data selection unit 2 and the feedback data S5 from the fill bit adder 5 are filled to the MSB side is exhibited. In this case, the bit shift set in the shift circuit is set based on the data length of the data S5 fed back from the fill bit adder 5 (output data S82 of the feedback data length generator 82 mentioned later).

The register 32 holds 58 bits of the coupled data generated at the coupler 31 synchronous to the system clock and outputs them to the output unit 4.

The output unit 4 outputs 32 bits' worth of the data on the MSB side as the bit stream Sout and outputs the remaining LSB side data as feedback data S4 to the fill bit adder 5 when the data length StL of the coupled data S3 calculated at the data processor 8 mentioned later reaches 32 bits. Note that the data length of the feedback data S4 at this time becomes the data length obtained by subtracting 32 bits' length from the data length StL.

Also, when the data length StL does not reach 32 bits, the unit outputs 31 bits' worth of the data on the MSB side as the feedback data S4 as it is to the fill bit adder 5.

The fill bit adder 5 outputs the feedback data S4 from the output unit 4 as it is as the feedback data S5 to the data coupler 3 when the enable signal EN is valid, that is, when the coupled data of the variable length encoded data Sc and the adding bit data Sa has been input to the register 22. Also, when the enable signal EN is invalid, it generates fill bits based on the data length StL of the coupled data S3 calculated at the data length processor 8 and adds them to the LSB side of the feedback data S4 from the output unit 4. The data with the fill bits added thereto is output as the feedback data S5 to the data coupler 3. Also, the data length SbL of the fill bits generated at this time is output to the data length processor 8.

Note that the more detailed configuration of the fill bit adder 5 will be explained later.

The data length adder 6 adds the information of data lengths corresponding to the variable length encoded data Sc and the additional bit data Sa, that is, the variable length encoded data length data ScL and the additional bit data length data SaL, and outputs the result of addition to the data length selection unit 7. Accordingly, the data length of the result of addition by the data length adder 6 is equal to the data length of the coupled data of the coupler 1.

The data length selection unit 7 selects the data length of the result of addition of the data length adder 6 or the data length SmL of the marker Sm input in accordance with the selection signal SEL and outputs the selected data length to the data length processor 8. Note that, in the JPEG, the data length SmL of the marker Sm is usually a fixed value of 16 bits. This data length selection unit 7 has a selector 71 and register 72 in the example of FIG. 4.

The selector 71 selects the data length of the result of addition of the data length adder 6 or the data length SmL of the input marker Sm in accordance with the selection signal SEL and outputs the selected data length to the register 72.

The register 72 holds the data length selected at the selector 71 synchronous to the system clock and outputs the same to the data length processor 8. Note that when the enable signal EN becomes invalid, it suspends the input of new data from the selector 71.

The data length processor 8 is a circuit block for calculating the data length StL of the coupled data S3 supplied from the data coupler 3 to the output unit 4 based on the data length selected at the data length selection unit 7 and the data length of the fill bits generated at the fill bit adder 5 and outputting this to the fill bit adder 5 and the output unit 4. In the example of FIG. 4, it has a register 81, feedback data length generator 82, data length adder 83, data length adder 84, and selector 85.

The register 81 holds a coupled data length S85 selected at the selector 85 synchronous to the system clock and outputs the held data length as the data length StL of the coupled data S3 to the output unit 4, fill bit adder 5, and feedback data length generator 82. The register 81 holds the data length of the output-waiting data which has not been output at the output unit 4 in the data held in the register 32.

The feedback data length generator 82 is a circuit block for calculating the data length of the feedback data S4 from the output unit 4 to be input to the fill bit adder 5. Namely, when the data length StL reaches 32 bits and the data Sout of 32 bits is output from the output unit 4, it generates a data length S82 obtained by subtracting 32 bits from the data length StL and outputs this to the data length adder 83 and the data length adder 84. Also, when the data length StL does not reach 32 bits, it outputs the data length StL as it is as the data length S82 to the data length adder 83 and data length adder 84.

The data length adder 83 adds the data length S82 from the feedback data length generator 82 and the data length selected at the data length selection unit 7 and outputs this result of addition to the selector 85.

The data length adder 84 adds the data length S82 from the feedback data length generator 82 and the data length SbL of the fill bits generated at the fill bit adder 5 and outputs this result of addition to the selector 85.

The selector 85 selects the data length S84 of the result of addition of the data length adder 84 when the enable signal EN becomes invalid and outputs this to the register 81. Also, when the enable signal EN is valid, it selects a data length S83 as the result of addition of the data length adder 83 and outputs this to the register 81.

Next, an explanation will be made of the operation for generation of a bit stream at the bit stream generator 133 having the above configuration.

First, an explanation will be made of a case where variable length data has been selected by the selection signal SEL. In this case, the selector 21 of the data selection unit 2 selects the output data of the coupler 1 by the selection signal SEL, and the register 22 holds the 27 bits of coupled data obtained by coupling the variable length encoded data Sc and the additional bit data Sa. Corresponding to this, the selector 71 of the data length selection unit 7 selects the output data length of the data adder 6 by the selection signal SEL, and the register 72 holds the data length obtained by adding the variable length encoded data length data ScL and the additional bit data length data SaL. Namely, the register 72 holds the data length of the coupled data held in the register 22.

Also, when the variable length data has been selected as the input data, since the enable signal EN is always valid, the operation for generation and addition of the fill bits by the fill bit adder 5 is suspended, and the feedback data S4 from the output unit 4 is supplied as it is to the coupler 31 of the data coupler 3 as the feedback data S5. This feedback data S5 and the variable length data S2 of the input held at the data selection unit 2 are coupled at the coupler 31 and held in the register 32.

Also, since the enable signal EN is valid, the additional data length S83 by the data length adder 83 is selected at the selector 85 of the data length processor 8. This is held in the register 81. This additional data length S83 is the data obtained by adding the data length of the variable length data S2 held in the register 22 of the data selection unit 2 and the data length S82 of the feedback data S4 generated at the feedback data length generator 82 and corresponds to the data length of the coupled data S31 before being held in the register 32.

When the variable length encoded data Sc and the additional bit data Sa are sequentially input in this state, when the data length StL of the not yet output data held in the register 32 of the data coupler 3 does not reach 32 bits, the MSB side of the variable length data S2 of the register 22 is coupled to the LSB side of the feedback data S5 which has not been output fed back from the output unit 4, and the coupled data is sequentially held in the register 32 Also, the register 81 of the data length processor 8 sequentially cumulative adds and holds the data lengths of the variable length data S2 input to the register 72. Accordingly, the data length StL of the not yet output data becomes longer together with the input of the variable length data (variable length encoded data Sc and additional bit data Sa).

Then, when this not yet output data length StL reaches 32 bits, the MSB side 32 bits of the not yet output data held in the register 32 are output as the output data Sout from the output unit 4, while the remaining LSB side 26 bits are fed back to the fill bit adder 5. Also, the feedback data length generator 82 of the data length processor 8 subtracts the output data length (32 bits) from the data length StL of the not yet output data. Accordingly, whenever the not yet output data length StL reaches 32 bits and each 32 bits of data are output from the output unit 4, the data length StL of the not yet output data becomes shorter by 32 bits.

In this way, the sequentially input variable length encoded data Sc and additional bit data Sa are sequentially coupled at the data coupler 3 and held, and the data of the MSB side 32 bits of this held data are sequentially output from the output unit 4.

The 32-bit bit stream Sout output from the output unit 4 is further transformed to 8-bit bit streams by a not illustrated circuit of the bit stream generation circuit 133 and sequentially output to the bus 106 of the image compressor 104. For example, by sequentially selecting each 8 bits of data from among these generated 32 bits by the selector circuit operating synchronous to a clock having a frequency four times the system clock and sequentially holding the selected data in an 8-bit register and outputting the same, 8-bit data streams are obtained.

Next, an explanation will be made of a case when the selection signal SEL changes and the input data is switched from the variable length data to the marker Sm. In this case, the selector 21 of the data selection unit 2 selects the marker Sm and holds it in the register 22. Also, the selector 71 of the data length selection unit 7 selects the data length SmL of the marker Sm and holds it in the register 72. Namely, the marker Sm is held in the register 22, while the data length SmL of the marker Sm is held in the register 72.

When the enable signal EN becomes invalid in accordance with the change of this selection signal SEL, fill bits of a data length in accordance with the not yet output data length StL are generated at the fill bit adder 5 and added to the LSB side of the feedback data S4 and, at the same time, this fill bit length SbL is output to the data length adder 84 of the data length processor 8. Also, the selector 85 of the data length processor 8 selects the additional data length S84 obtained by adding this fill bit length SbL and feedback data length S82 and holds this in the register 81. Also, since the enable signal EN is invalid, the holding of new data by the register 22 and the register 72 is suspended. Namely, the marker Sm of the register 22 and the data length SmL of the register 72 are continuously held as they are.

When the fill bits are once added to the feedback data, S4 in this way, the not yet output data length StL held in the register 32 becomes the data length of a whole multiple of one byte, and the fill bit length SbL generated in the clock cycle after this becomes zero. Accordingly, the not yet output data length StL held in the register 81 becomes constant.

Also, the marker Sm held in the register 22 is coupled to the tail end of the fill bits added at the fill bit adder 5 and held in the register 32, but the data length SmL of the marker Sm has not been added to the not yet output data length StL, so a portion of the marker Sm is not contained in the range of the not yet output data. Accordingly, this portion will not be output from the output unit 4.

Here, when the selection of the input data by the selection signal SEL is switched again from the marker Sm to the variable length data, and the enable signal EN returns to the valid state in accordance with this, the holding of new data by the register 22 and the register 72 is re-started.

Also, the data length obtained by adding the marker data length SmL to the not yet output data length StL is held in the register 81, so the coupled data S3 containing the marker Sm coupled to the tail end of the fill bits becomes the data to be output by the output unit 4.

After this, the above operation for generation of a bit stream by the coupling of the variable length data and the output of 32 bits data is repeated.

Figure 5:
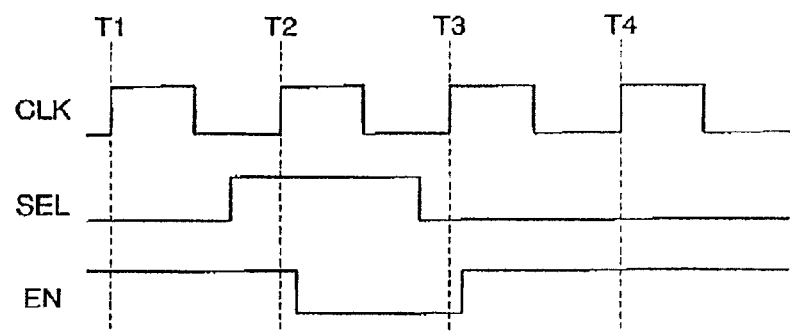
FIG. 5 is a timing chart showing an example of timings of a selection signal and an enable signal with respect to a system clock.
Figure 6:
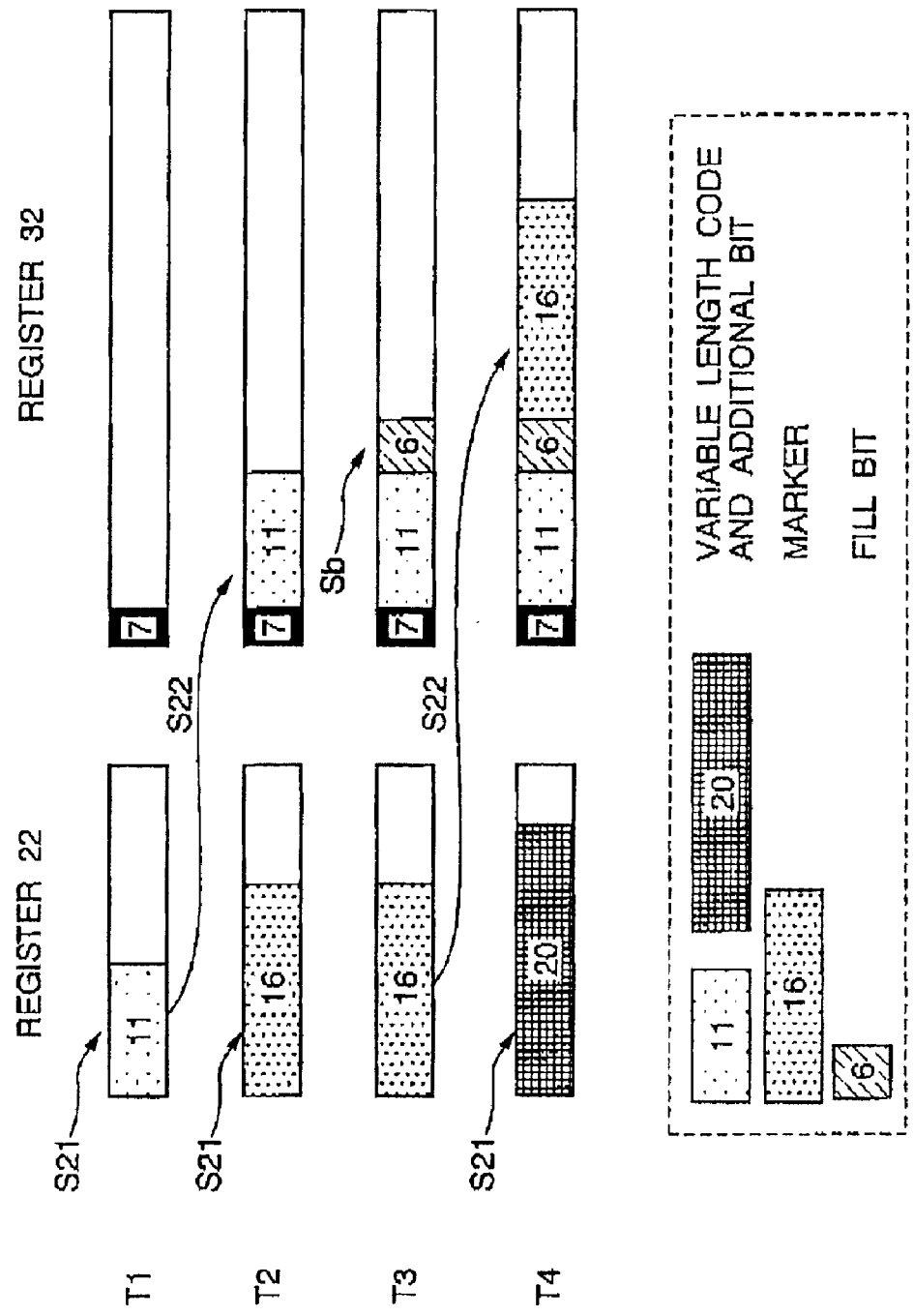
FIG. 6 is a view showing an example of data held in each register at each time of the timing chart shown in FIG. 5.

Here, an explanation will be made of a concrete example of the operation for generation of a bit stream by referring to FIG. 5 and FIG. 6. FIG. 5 is a timing chart showing an example of timings of the selection signal SEL and enable signal EN with respect to a system clock. Also, FIG. 6 is a view of an example of the data held in the register 22 and the register 32 at time T1 to time T4 of the timing chart shown in FIG. 5.

Note that, in the example of FIG. 5, the marker Sm is selected when the selection signal SEL is the high level, while the variable length data is selected when it is the low level. The enable signal EN becomes valid in the case of a high level and becomes invalid in the case of a low level. Also, the registers of FIG. 4 hold data synchronous to the rising of a system clock CLK.

Time T1: The variable length data is selected at the selector 21, and 11 bits of variable length data from the coupler 1 are held in the register 22. Also, the register 32 holds the 7 bits of not yet output data.

Time T2: The selection signal SEL becomes the high level, the selector 21 selects the 16 bits of the marker Sm, and the register 22 holds them. Also, the 11 bits of the variable length data held in the register 22 at the time T1 are coupled to the LSB side of the 7 bits of the not yet output data and held in the register 32.

Time T3: The selection signal SEL becomes the high level, and the output data from the coupler 1 is selected at the register 22, but since the enable signal EN has become invalid, the marker Sm held in the register 22 is continuously held as it is.

Also, since the enable signal EN is invalid, the operation for generation and addition of the fill bits at the fill bit adder 5 becomes valid, and 6 bits of fill bits in accordance with the data length of 18 bits (7 bits+11 bits) of the not yet output data held in the register 32 are generated. The data length of the not yet output data has not reached 32 bits, so this not yet output data is fed back as it is to the fill bit adder 5 as the feedback data S4, and 6 bits of fill bits are added to the LSB side. By this, 24 bits of feedback data S5 are generated and input to the coupler 31. The 24 bits of feedback data SS are filled to the MSB side, output from the coupler 31, and held in the register 32 as they are.

Time T4: Since the enable signal EN becomes valid and the holding operation of the register 22 is restarted, 20 bits of variable data from the coupler 1 are held in the register 22 synchronous to the rising of the clock.

Also, the 16 bits of the marker Sm held in the register 22 are coupled to the LSB side of the 24 bits of feedback data S5 at the coupler 31 and held in the register 32.

In this way, by the addition of 6 bits of fill bits to the tail end side of the not yet output data at the fill bit adder 5, the data border of the marker Sm coincides with the byte border of the bit stream.

[Fill Bit Adder]

Next, a detailed explanation will be made of the fill bit adder 5 of the bit stream generator 133 mentioned above by referring to FIG. 7 to FIG. 13.

Figure 7:
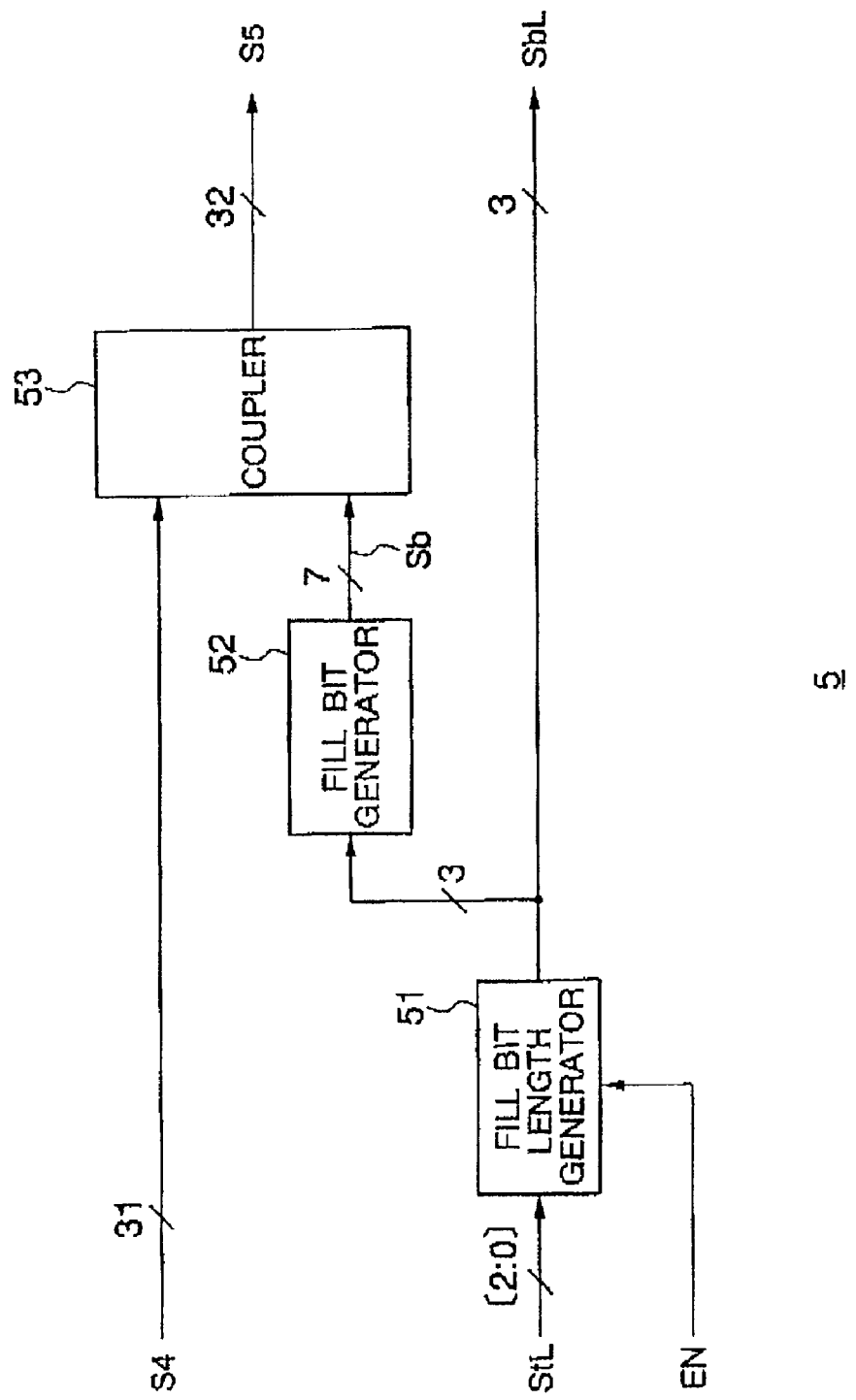
FIG. 7 is a schematic view of the configuration for explaining a fill bit adder shown in FIG. 4.

FIG. 7 is a schematic view of the configuration for explaining the fill bit adder 5 shown in FIG. 4. In this figure, the fill bit adder 5 has a fill bit length generator 51, fill bit generator, and coupler 53.

Note that, the fill bit length generator 51 is an embodiment of an adjustment data length setting means of the present invention.

The fill bit generator 52 is an embodiment of an adjustment data generating means of the present invention.

The coupler 53 is an embodiment of an adding means of the present invention.

The coupler 53 adds the fill bits Sb generated at the fill bit generator 52 to the LSB side of the feedback data S4 input from the output unit 4 to generate 32 bits of feedback data S5 filled to the MSB side.

Since the feedback data S4 is filled to the MSB side, by for example shifting the fill bits Sb from the MSB to the LSB side by exactly the data length StL of the feedback data S4 by a not illustrated shift circuit included in the coupler 53 and combining the shifted fill bits Sb and the feedback data S4 by a not illustrated OR circuit, feedback data S5 with the fill bits Sb added thereto can be generated.

The fill bit length generator 51 generates the data length SbL of the fill bits in accordance with the lower significant three bits of the not yet output data length StL calculated at the data length processor 8 and outputs this to the fill bit generator 52 and the data length adder 84 of the data length processor S.

Figure 8:
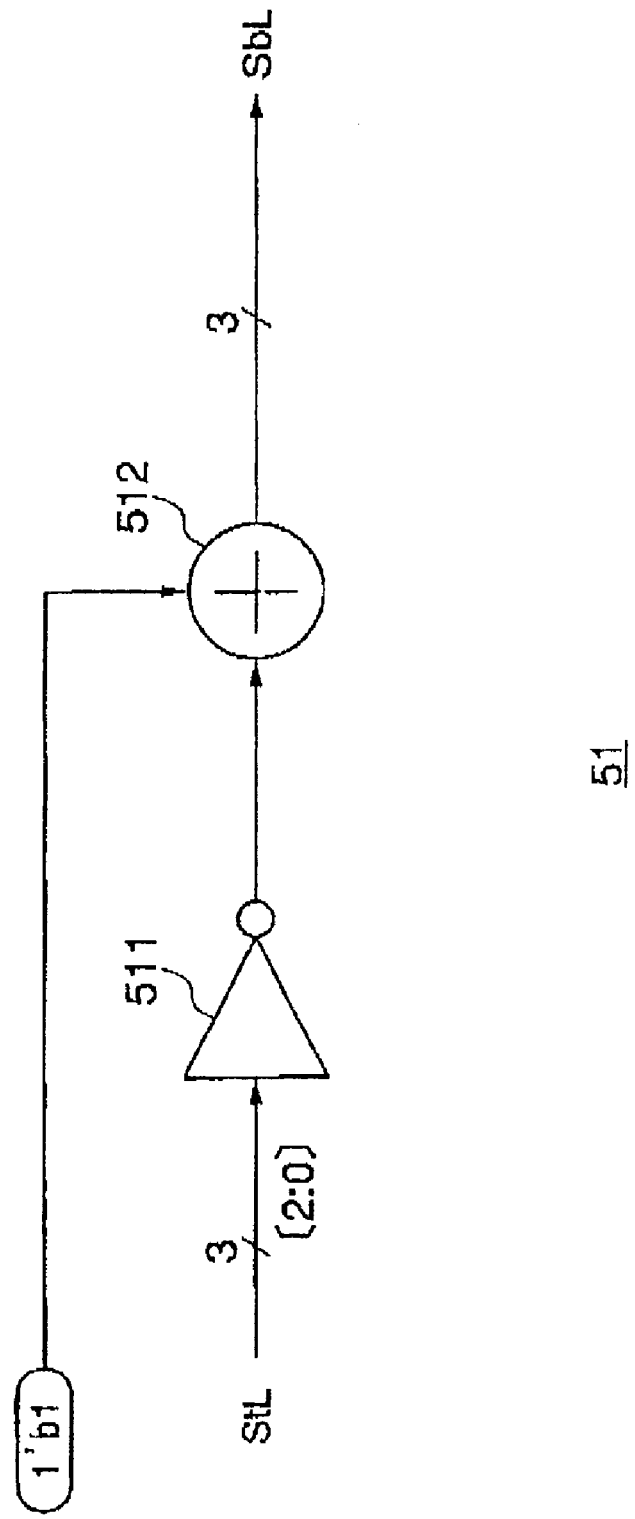
FIG. 8 is a schematic view of the configuration for explaining a fill bit length generator shown in FIG. 7.

FIG. 8 is a schematic view of the configuration for explaining an example of the fill bit length generator 51 shown in FIG. 7. The fill bit length generator 51 has a 3-bit input NOT circuit (inverter) 511 and adder 512.

This fill bit length generator 51 inverts the lower significant three bits of the not yet output data length StL in their bit values for every bit in the NOT circuit 511 and further adds the data of a value "1" to the least significant bit of the data after inversion in the NOT circuit 511 to thus generate 3 bits of the fill bit length SbL.

Note that when the enable signal EN is valid, the fill bit length is forcibly set to zero by a not illustrated gate circuit etc., so fill bits are not generated in the fill bit generator 52 mentioned later. Accordingly, the feedback data S4 input to the coupler 53 is output as it is as the feedback data S5 to the data coupler 3.

FIG. 9 is a view of an example of the correspondence between the not yet output data length StL and the fill bit length SbL. As seen from FIG. 9, when the lower significant three bits of the not yet output data length StL have values "000", the insertion of fill bits is not necessary. When insertion of fill bits is necessary, the fill bit length SbL is set so that a result of addition of the fill bit length SbL to the lower significant three bits of the not yet output data length StL becomes the values "1000". Accordingly, the fill bit length SbL is obtained by subtracting the lower significant three bits of the not yet output data length StL from the value "1000". This becomes equal to the result of addition of the value "1" to the subtraction result from the value "111".

Namely, the fill bit length SbL is generated by the fill bit length generator 51 of FIG. 8 wherein a value "1" is added to the result of bit inversion of lower significant three bits of the not yet output data length StL.

Note that, the fill bit length generator shown in FIG. 8 is an embodiment. Other configurations are also possible. As more general example, for example, it is also possible to calculate a quotient obtained by dividing the not yet output data length StL by the data length serving as the unit of the borders (8 bits in the case of the byte border) and find the fill bit length as the difference between the result of this calculation and the unit data length.

This concludes the explanation of the fill bit length generator 51.

Next, an explanation will be made of the fill bit generator 52 of FIG. 7.

The fill bit generator 52 generates the fill bits filled to the MSB side in accordance with the fill bit length SbL generated at the fill bit length generator 51 and inputs this to the coupler 53.

Figure 10:
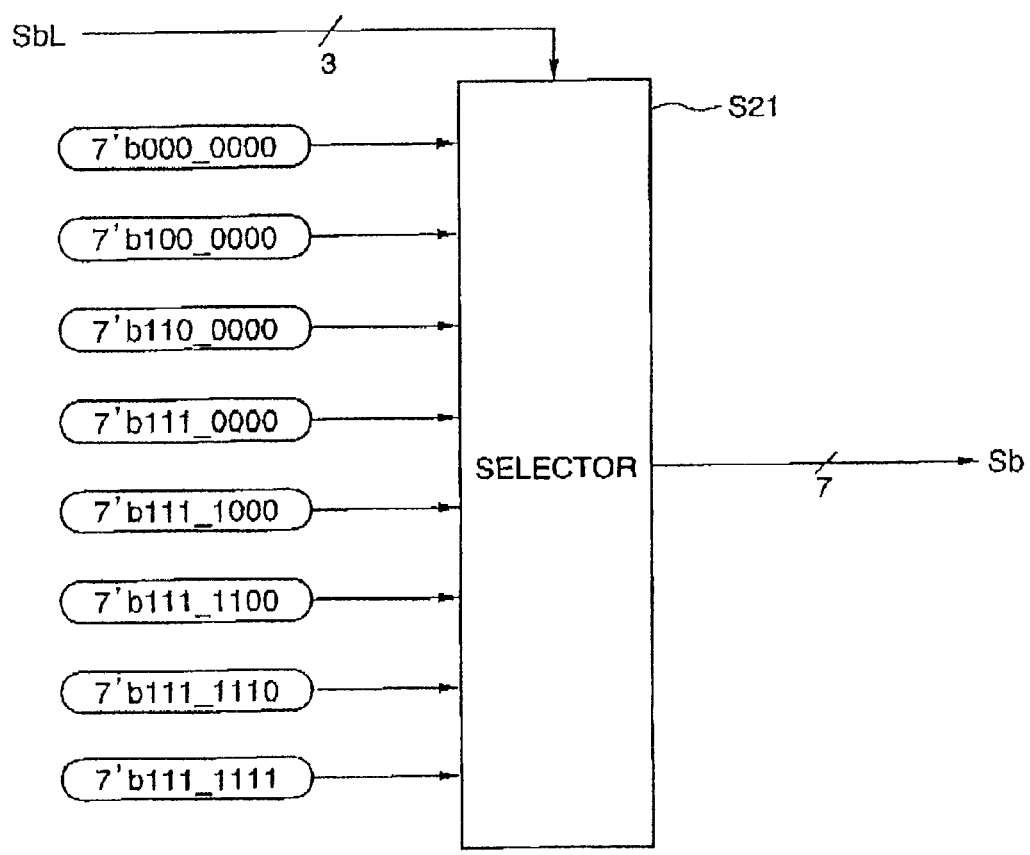
FIG. 10 is a schematic view of the configuration for explaining the fill bit generator shown in FIG. 7.

FIG. 10 is a schematic view of the configuration for explaining an example of the fill bit generator shown in FIG. 7. In this figure, the fill bit generator 52 has a selector 521.

As shown in FIG. 11, the fill bit lengths (0 bit to 7 bit) and the eight types of fill bits filled to the MSB side are in a one-to-one correspondence. These eight types of fill bits are input to the selector 521. The corresponding fill bits are selected from among these fill bits in accordance with the fill bit length SbL and output to the coupler 53.

Figure 12:
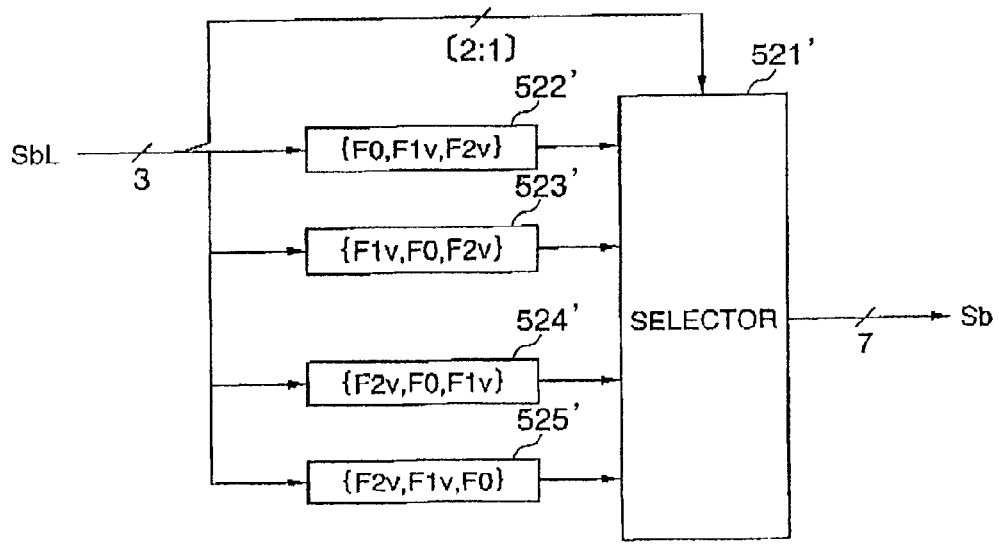
FIG. 12 is a schematic view of the configuration for explaining another example of the fill bit generator shown in FIG. 7.

FIG. 12 is a schematic view of the configuration for explaining another example of the fill bit generator shown in FIG. 7. A fill bit generator 52' has a selector 521' and a data generator 522' to data generator 525'.

The data generator 522' to data generator 525' couple the least significant bit F0 of the fill bit length SbL, 2 bits of data F1$v$ in accordance with the value of the first bit F1, and 4 bits of data F2$v$ in accordance with the value of the second bit F2 in a predetermined sequence to generate 7 bits of data and output this to the selector 521'.

The selector 521' selects one set of data from among the generated data of the data generator 522' to data generator 525' in accordance with the data of the upper significant two bits of the fill bit length SbL and outputs this as the fill bits Sb.

FIG. 13 is a view of an example of correspondence between the fill bits generated at the fill bit generator 52' shown in FIG. 12 and fill bit lengths. The 2-bit data F1$v$ corresponding to the bit F1 of the fill bit length SbL is generated as 2 bits' worth of the bit F1 linked together, while the 4-bit data F2$v$ corresponding to the bit F2 is generated as 4 bits' worth of the bit F2 linked together.

By the coupling of these data F1$v$, data F2$v$, and bit F0 in four combinations of {F0, F1$v$, F2$v$}, {F1$v$, F0, F2$v$}, {F2$v$, F0, F1$v$}, and {F2$v$, F1$v$, F0}, 7 bits of fill bits filled to the MSB side can be generated with the same correspondence as that of FIG. 11. Also, these four combinations are in one-to-one correspondence with the upper significant two bits of data (bit F1 and bit F2) of the fill bit length SbL. Therefore, by selecting one of the four combinations by using the 2-bit data, the fill bits Sb can be generated from the fill bit length SbL with the same correspondence as that of FIG. 11.

In the fill bit generator 52' shown in FIG. 12, the number of the data selected at the selector circuit becomes half in comparison with the fill bit generator 52 of FIG. 10, so the circuit scale can be made smaller than the fill bit generator 52.

As explained above, according to the bit stream generator 133 shown in FIG. 4 of the first embodiment, when the data length StL of the data coupled at the data coupler 3 and not yet output reaches 32 bits, 32 bits' worth of data is output from the MSB side of the not yet output data at the output unit 4, and the data remaining after the output is output as the feedback data S4 to the fill bit adder 5. Also, when the data length of the not yet output data does not reach 32 bits, this not yet output data is output as it is as the feedback data S4 to the fill bit adder 5. When the input data selected in accordance with the selection signal SEL is variable length data, the feedback data S4 input to the fill bit adder 5 is output as it is as the feedback data S5 to the data coupler 3. When the input data selected in accordance with the selection signal SEL is the marker Sm, fill bits Sb having a data length of the difference between the data length StL of the feedback data S4 and the data length of a whole multiple of one byte are generated at the fill bit adder 5, added to the LSB side of the feedback data S4, and output as the feedback data S5 to the data coupler 3. In the data coupler 3, the MSB of the input data from the data selection unit 2 is coupled to the LSB side of the feedback data S5 and supplied to the output unit 4. Accordingly, the variable length data sequentially input synchronous to the system clock is sequentially transformed to 32 bits of data synchronous to the same system clock. At the same time, even in the case when the marker Sm is inserted, a waiting time of only one clock is generated due to the operation for generation and addition of the fill bits, so the processing for generation of a bit stream including the processing for insertion of the fill bits can be made much more efficient in comparison with the case when the same function is realized by for example software.

Second Embodiment

Next, an explanation will be made of a second embodiment according to the present invention by referring to FIG. 14 to FIG. 17.

In the first embodiment, when the operation for generation and addition of the fill bits is carried out, the input of new data is suspended in the register 22 and the register 72 receiving the enable signal EN. For this reason, it suffers from the disadvantage in that at least one clock of waiting time is generated in the input of data. The present embodiment can execute the operation for generation and addition of fill bits without generating such waiting time.

The overall configuration and operation of the camera system of the present embodiment, internal configuration and operation of the JPEG processor thereof, and the configuration of the variable length encoder are the same as those of the camera system 100 of the first embodiment mentioned above by referring to FIG. 1 to FIG. 3, so an explanation thereof will be omitted.

Below, an explanation will be made of the bit stream generator 133' of the variable length encoder 123 characteristic of the present invention.

[Bit Stream Generator]

First, an explanation will be made of the configuration of the bit stream generator 133' by referring to FIG. 14.

Figure 14:
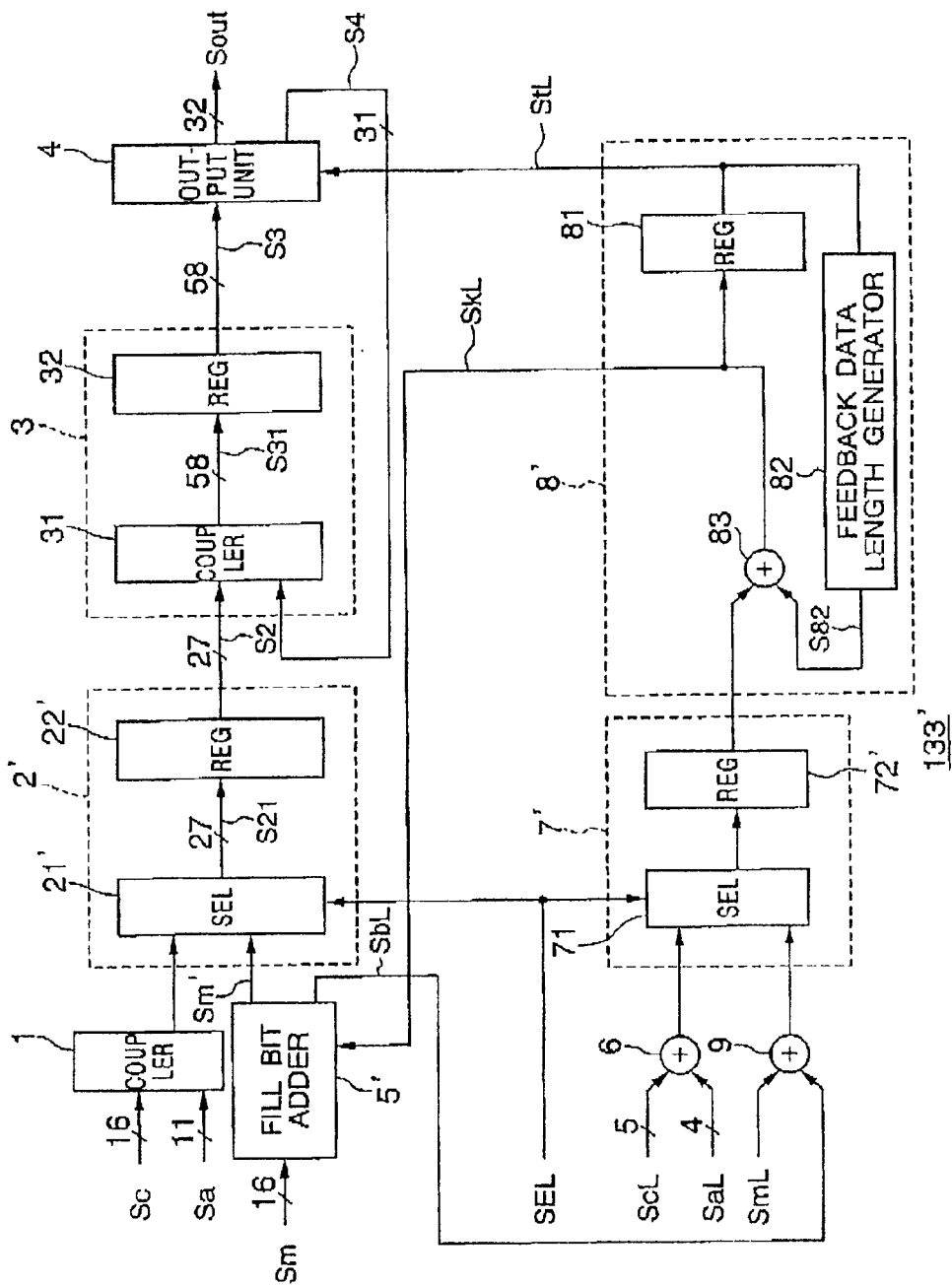
FIG. 14 is a schematic view of the configuration for explaining the bit stream generator of a second embodiment according to the present invention.

FIG. 14 is a schematic view of the configuration for explaining the bit stream generator 133' of the second embodiment according to the present invention. The bit stream generator 133' has a coupler 1, data selection unit 2', data coupler 3, output unit 4, fill bit adder 5', data length adder 6, data length selection unit 7', data length processor 8', and data length adder 9. Note, the same reference numerals in FIG. 4 and FIG. 14 indicate the same components.

Also, the fill bit adder 5' is an embodiment of the data adder of the present invention.

The data length adder 6 is an embodiment of the first data length generating means of the present invention.

The data length processor 8' is an embodiment of the data length processing means of the present invention.

The data length adder 9 is an embodiment of the second data length generating means of the present invention.

The coupler 1 couples the 16 bits of the variable length encoded data Sc and the 11 bits of the additional bit data Sa input from the variable length code processor 131 to generate 27 bits of data and outputs the same to the data selection unit 2'.

The data selection unit 2' selects the 27 bits of the coupled data S21 obtained by coupling the variable length encoded data Sc and the additional bit data Sa at the coupler 1 or the marker Sm' with the fill bits added thereto at the fill bit adder 5' mentioned later in accordance with the selection signal SEL and outputs the same to the data coupler 3.

The difference from the data selection unit 2 in FIG. 4 resides in that the register 22' is not made to stop receiving input of data in accordance with the enable signal EN.

The data coupler 3 couples the 27 bits of the data S2 selected at the data selection unit 2 and the data S4 fed back from the output unit 4 to generate 58 bits of coupled data and outputs this to the output unit 4.

The output unit 4 outputs the 32 bits' worth of data on the MSB side as the bit stream Sout and feeds back the remaining LSB side data as the feedback data S4 to the data coupler 3 when the data length StL of the coupled data S3 calculated at the data length processor 8' mentioned later has reached 32 bits. Note that the data length of the feedback data S4 at this time becomes the data length obtained by subtracting 32 bits from the data length StL.

Also, when the data length StL has not reached 32 bits, the 31 bits' worth of data on the MSB side is fed back as the feedback data S4 to the data coupler 3.

The fill bit adder 5' generates the fill bits based on the data length SkL of the coupled data S31 of the coupler 31 calculated at the data length processor 8' and adds the same to the MSB side of the input 16 bits of marker Sm. This data with the fill bits added thereto is output as the marker Sm' to the data selection unit 2. Also, the data length SbL of the fill bits generated at this time is output to the data length adder 9.

Figure 15:
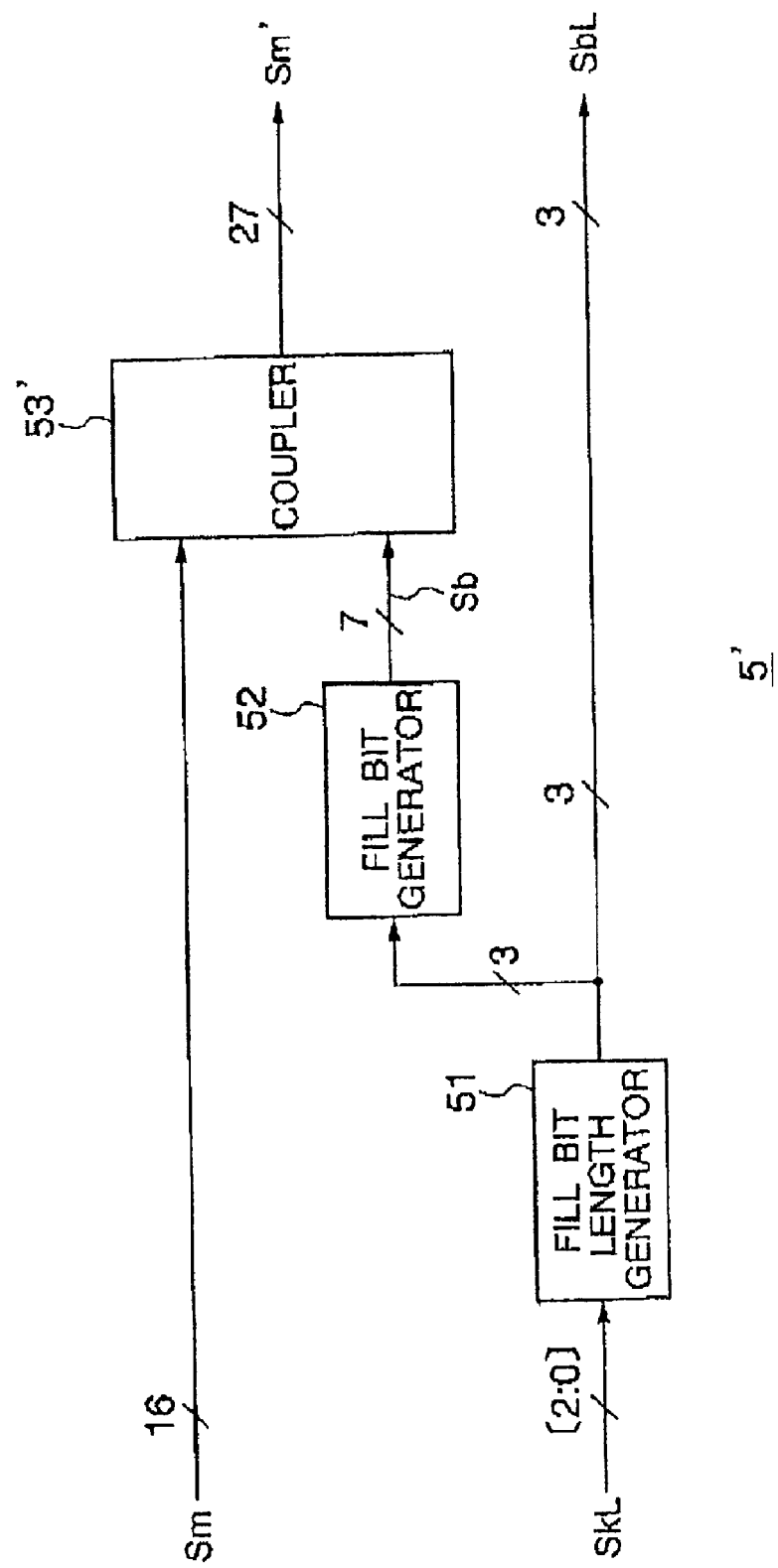
FIG. 15 is a schematic view of the configuration for explaining the fill bit adder of the bit stream generator shown in FIG. 14.

FIG. 15 is a schematic view of the configuration for explaining this fill bit adder 5'. The fill bit adder 5' has a fill bit length generator 51', fill bit generator 52, and coupler 53'. Note that the same reference numerals in FIG. 7 and FIG. 15 indicate the same components.

In the fill bit adder 5 shown in FIG. 7, the coupler 53 adds the fill bits to the LSB side of the input feedback data S4. In contrast, in the coupler 53' of the fill bit adder 5' shown in FIG. 15, the fill bits are added to the MSB side of the input marker Sm. Also, the output value of the fill bit length generator 51' is no longer controlled in accordance with the enable signal EN. The fill bit adder 5 and the fill bit adder 5' are different in these points, but are the same in the rest of their configuration (fill bit generator 52).

The data length adder 6 adds the information of data lengths corresponding to the variable length encoded data Sc and the additional bit data Sa, that is, the variable length encoded data length data ScL and additional bit length data SaL, and outputs this result of addition to the data length selection unit 7'. Accordingly, the data length of the result of addition by the data length adder 6 is equal to the data length of the coupled data by the coupler 1.

The data length adder 9 adds the information of the data lengths corresponding to the marker Sm and the fill bits Sb, that is, the marker SmL and the fill bit length SbL, and outputs this result of addition to the data length selection unit 7'. Accordingly, the data length of the result of addition by the data length adder 9 is equal to the data length of the marker Sm' obtained by adding the fill bits Sb to the marker Sm at the fill bit adder 5'.

The data length selection unit 7' selects the data length of the result of addition of the data length adder 6 or the data length of the result of addition of the data length adder 9 in accordance with the selection signal SEL and outputs the same to the data length processor 8'.

The difference from the data length selection unit 7 in FIG. 4 resides in that the input of the data to the register 72' is not suspended in accordance with the enable signal EN.

The data length processor 8' calculates the data length StL of the coupled data S3 supplied from the data coupler 3 to the output unit 4 based on the data length selected at the data length selection unit 7' and outputs this to the output unit 4. Also, it outputs the data length StL at the coupler 31 of the data coupler 3 to the fill bit adder 5'.

The data length processor 8' shown in FIG. 14 differs from the data length processor 8 shown in FIG. 4 in the points that the data length adder 84 and the selector 85 are deleted and that the result of addition of the data length adder 83 is output as it is to the register 81, but the rest of the configuration (register 81, feedback data length generator 82, and data length adder 83) is the same as the data length processor 8.

Next, an explanation will be made of the operation for generation of a bit stream in the bit stream generator 133' having the above configuration.

First, an explanation will be made of the case where the variable length data is selected by the selection signal SEL. In this case, the output data of the coupler 1 is selected by the selection signal SEL at the selector 21 of the data selection unit 2', and 27 bits of coupled data obtained by coupling the variable length encoded data Sc and the additional bit data Sa is held in the register 22'. Also, corresponding to this, the selector 71 of the data length selection unit 7' selects the output data length of the data adder 6 by the selection signal SEL, and the register 72' holds the data length obtained by the addition of the variable length encoded data length data ScL and the additional bit data length data Sa. Namely, the register 72' holds the data length of the coupled data held in the register 22'.

When the variable length encoded data Sc and additional bit data Sa are sequentially input in this state, when the data length StL of the not yet output data held in the register 32 of the data coupler 3 does not reach 32-bits, the MSB side of the variable length data S2 of the register 22' is coupled to the LSB side of the not yet output feedback data S4 fed back from the output unit 4, and the coupled data is sequentially held in the register 32. Also, the register 81 of the data length processor 8' sequentially cumulative adds and holds the data lengths of the variable length data S2 input to the register 72'. Accordingly, the data length StL of the not yet output data becomes longer along with the input of the variable length data (variable length encoded data Sc, and additional bit data Sa).

Then, when this not yet output data length StL reaches 32 bits, the MSB side 32 bits of the not yet output data held in the register 32 are output from the output unit 4 as the output data Sout, and the remaining LSB side 26 bits are fed back to the data coupler 3. Also, the output data length (32 bits) is subtracted from the data length StL of the not yet output data at the feedback data length generator 82 of the data length processor 8'. Accordingly, whenever the not yet output data length StL reaches 32-bits and 32 bits of data are output from the output unit 4, the data length StL of the not yet output data becomes shorter by 32 bits.

In this way, sequentially input variable length encoded data Sc and additional bit data Sa are sequentially coupled and held at the data coupler 3, and the MSB side 32 bits of data of this held data are sequentially output from the output unit 4.

The 32-bit bit stream Sout output from the output unit 4 is further transformed to 8-bit bit streams by a not illustrated circuit of the bit stream generation circuit 133' and sequentially output to the bus 106 of the image compressor 104. For example, by sequentially selecting 8 bits of data from among these generated 32 bits by the selector circuit operating synchronous to a clock having a frequency four times the system clock and sequentially holding the selected data in an 8-bit register and outputting the same, 8-bit bit streams are obtained.

Next, there is the case where the selection signal SEL changes and the input data is changed over from the variable length data to the marker Sm. In this case, only the input data is changed over from the variable length data to the marker Sm, so operations for the coupling and output of the data are similarly carried out as in the case where the input data is variable length data.

The difference between the bit stream generator 133 of FIG. 4 and the bit stream generator 133' of FIG. 14 resides in that the fill bits to be added to the marker Sm are always generated regardless of the state of the selection signal SEL and that the marker Sm' with the fill bits added thereto is decided before it is held in the register 22'.

The value of the fill bit length to be added to the marker Sm before it is held in the register 22' is determined in accordance with the difference of the sum of the data length of the feedback data S4 and the data length of the input data which has been already held in the register 22' (that is the data length of the not yet output data S31 to be held in the register 32 in the next clock) relative to the data length of a whole multiple of an 8-bit length. Accordingly, when the data length SkL of the data addition unit 83 corresponding to the data length of this sum is supplied to the fill bit adder 5', the fill bit length SbL and the fill bits Sb are determined irrelevant to the state of the selection signal SEL. For this reason, when the data to be inserted as the marker Sm is set synchronous to the system clock, before the input data is held in the register 22' by the next clock, the marker Sm' with the fill bits added thereto at the fill bit adder 5' is generated and supplied to the register 22' in accordance with the selection signal SEL.

Here, an explanation will be made of a concrete example of the operation for generation of the bit stream mentioned above by referring to FIG. 16 and FIG. 17. FIG. 16 is a timing chart showing an example of timing of the selection signal SEL with respect to the system clock. Also, FIG. 17 is a view of an example of the data held in the register 22' and the register 32 at the time T1' to time T3' of the timing chart shown in FIG. 16.

Note that, in the example of FIG. 16, the marker Sm is selected when the selection signal SEL is the high level, and the variable length data is selected when it is the low level. Also, the registers of FIG. 14 hold data synchronous to the rising of the system clock CLK.

Time T1': he variable length data is selected at the selector 21, and the 7 bits of variable length data from the coupler 1 are held in the register 22'. Also, the register 32 holds the 11 bits of the not yet output data.

Also, for a term from this time T1' to time T2', a data length obtained by adding the data length of the variable length data held in the register 22' and the data length of the not yet output data held in the register 32 (7 bits+11 bits=18 bits) is supplied as the data length SkL to the fill bit adder 5'. The fill bit adder 5' generates 6 bits of fill bits based on this supplied data length SkL, adds the generated fill bits to the MSB side of the marker Sm, and supplies the result to the data selection unit 2'.

Time T2': The selection signal SEL becomes the high level, and the marker Sm' of the fill bit adder 5' is selected at the selector 21 and held in the register 22'. Also, the 7 bits of the variable length data held in the register 22' at the time T1' are coupled to the LSB side of the 11 bits of the not yet output data and held in the register 32. By this, the data length of the not yet output data becomes 18 bits.

Time T3': The selection signal SEL becomes the high level, and the 14 bits of the variable length data from the coupler 1 are held in the register 22'. Also, the coupled data of the fill bits and the marker Sm held in the register 22' at the time T2' is coupled to the LSB side of the 18 bits of the not yet output data and held in the register 32.

In this way, by the addition of 6 bits of the fill bits to the MSB side of the marker Sm at the fill bit adder 5', the data border of the marker Sm coincides with the byte border of the bit stream.

As explained above, according to the bit stream generator 133' shown in FIG. 14 of the second embodiment, when the data length StL of the data coupled at the data coupler 3 and not yet output reaches 32 bits, 32 bits' worth of data is output from the MSB side of the not yet output data at the output unit 4, and the data remaining after the output is output as the feedback data S4 to the data coupler 3. Also, when the data length of the not yet output data does not reach 32 bits, this not yet output data is output as it is as the feedback data S4 to the data coupler 3. Also, the fill bit adder 5' generates the fill bits Sb having a data length of the difference between the data length SkL obtained by the addition of the data lengths of the input data S2 and the feedback data S4 at the data length adder 83 and the data length of a whole multiple of one byte. The generated fill bits Sb are added to the MSB side of the input marker Sm and output to the data selection unit 2'. The data selection unit 2' selects the marker Sm' with the fill bits added thereto or sequentially input variable length data in accordance with the selection signal SEL. The data coupler 3 couples the MSB side of this selected data to the LSB side of the feedback data S4 and supplies the result to the output unit 4. Accordingly, variable length data sequentially input synchronous to the system clock is sequentially transformed to 32 bits of data synchronous to the same system clock. At the same time, when the marker Sm is inserted, no waiting time due to the operation for generation and addition of the fill bits is generated, so the processing for generation of a bit stream including the processing for insertion of the fill bits can be made further efficient in comparison with the first embodiment. Also, in the bit stream generator 133', the selector 85 and data length adder 84 of the data length processor 8 are deleted, so the circuit scale can be made smaller in comparison with the first embodiment. Also, control by the enable signal EN becomes unnecessary, so the control method can be simplified.

Note that, the present invention is not limited to the present embodiment. Various modifications are possible.

For example, the configurations of the camera system shown in FIG. 1, the JPEG processor shown in FIG. 2, and the variable length encoder shown in FIG. 3 are not limited to those illustrated. Any configurations can be employed.

Also, the configurations of the bit stream generators shown in FIG. 4 and FIG. 14 according to the present invention and the configurations of the fill bit adders shown in FIG. 7, FIG. 8, FIG. 10, FIG. 12, and FIG. 15 can be freely altered too.

Also, the present invention can also be applied to any encoded data other than JPEG encoded data and to any variable length data not the result of encoding.

Also, the present invention is not limited to JPEG encoding and image encoding. Also, it is not limited to only a camera system. It can be applied to any signal processing apparatus including variable length encoding processing.

Summarizing the effects of the invention, in this way, according to the present invention, a data stream generation apparatus, for generating a stream of a fixed length data of a predetermined number of bits from a stream of variable length data, having a smaller circuit scale and simple configuration and control by efficiently performing the processing for insertion of the fill bits and a method of the same can be provided.

Also, a variable length encoded data stream generation apparatus for variable length encoding intended data and efficiently generating the predetermined data stream having a smaller circuit scale and simpler configuration and control by efficiently performing the processing for insertion of the fill bits and a method of the same can be provided.

Further, a camera system for picking up an intended image and variable length encoding the picked up image data, particularly a camera system for variable length encoding the picked up image data and efficiently generating an image data stream with a smaller circuit scale and simpler configuration and control can be provided.

What is claimed is:

1. A data stream generation apparatus for sequentially coupling predetermined header bits of sequentially input data to a tail bit side of previously input data and sequentially outputting data having a predetermined data length from said header bit side of said coupled data, said data stream apparatus comprising:

a data outputting means for outputting said predetermined data length's worth of data from said header bit side of the not yet output data and outputting data remaining after the output as feedback data when the data length of said coupled data which has not been output reaches said predetermined data length and for outputting the not yet output data as said feedback data when the data length of said not yet output data does not reach said predetermined data length;

a data adding means for generating adjustment data having a data length of a difference between the data length of said feedback data and a data length of a whole multiple of a predetermined unit data length when said input data is the predetermined data and adding the same to said tail bit side of the feedback data; and a data coupling means for coupling said header bit of said input data to said tail bit side of said feedback data and supplying the coupled data as said not yet output data to said data outputting means.

2. A data stream generation apparatus as set forth in claim 1, wherein said apparatus further comprises a data length processing means for cumulatively adding the data length of said input data based on the input data length information sequentially input corresponding to said input data, subtracting said predetermined data length from the cumulative data length when the cumulative data length reaches said predetermined data length, and adding the data length of said adjustment data to the cumulative data length when said input data is control data; and said data output unit outputs the data of said predetermined data length when the cumulative data length of said data length processing means reaches said predetermined data length, while outputs said not yet output data as said feedback data when it does not reach said predetermined data length.

3. A data stream generation apparatus as set forth in claim 2, wherein said data adding means includes an adjustment data length setting means for setting an adjustment data length in accordance with the cumulative data length of said data length processing means when said input data is predetermined data, an adjustment data generating means for generating said adjustment data in accordance with said set adjustment data length, and an adding means for adding said generated adjustment data to said tail bit side of said feedback data, and wherein data length processing means adds said set adjustment data length to said cumulative data length when said input data is predetermined data.

4. A data stream generation apparatus as set forth in claim 3, wherein said adjustment data length setting means sets said adjustment data length in accordance with a difference between a quotient obtained by dividing the cumulative data length of said data length processing means by said unit data length and said unit data length.

5. A data stream generation apparatus as set forth in claim 3, wherein said adjustment data length setting means inverts bit values of lower significant data of a predetermined number of bits from the least significant bit in the binary value of the cumulative data length of said data length processing means and sets said adjustment data length in accordance with data obtained by adding a predetermined value to the bit inverted lower significant data.

6. A data stream generation apparatus as set forth in claim 3, wherein said adjustment data generating means selects one data from a plurality of predetermined data in accordance with said set adjustment data length and generates adjustment data in accordance with said selected data.

7. A data stream generation apparatus as set forth in claim 3, wherein said data generating means generates data in accordance with each bit value in the binary value of said set adjustment data length for each bit, selects one data from a plurality of data generated by coupling the generated data for each bit in a predetermined sequence in accordance with the bit value of at least one predetermined bit among the bits, and generates adjustment data in accordance with the selected data.

8. A data stream generation apparatus as set forth in claim 2, further comprising:

a data selecting means for selecting the sequentially input variable length data or said control data in accordance with a supplied selection signal and supplying said selected input data to said data coupling means; and a data length selecting means for selecting input data length information corresponding to said variable length data or said control data and supplying said selected input data length information to said data length processing means.

9. A data stream generation apparatus as set forth in claim 8, further comprising:

a variable length data coupling means for coupling a plurality of variable length data each having variable length and supplying the same to said data selecting means; and a data length generating means for generating input data length information of said coupled variable length data based on the input data length information corresponding to the plurality of variable length data and supplying the same to said data length selecting means.

10. A data stream generation apparatus for sequentially coupling predetermined header bits of sequentially input data to a tail bit side of previously input data and sequentially outputting data having a predetermined data length from said header bit side of said coupled data, said data stream generation apparatus comprising:

a data outputting means for outputting said predetermined data length's worth of the data from said header bit side of the not yet output data and outputting data remaining after the output as feedback data when the data length of said coupled data which has not been output reaches said predetermined data length and outputting the not yet output data as said feedback data when the data length of said not yet output data does not reach said predetermined data length;

a data adding means for generating adjustment data having a data length of a difference between a sum of data lengths of said input data and said feedback data and the data length of a whole multiple of a predetermined unit data length and adding the same to said header bit side of the input predetermined data;

a data selecting means for selecting predetermined data with said adjustment data added thereto or other input data in accordance with a supplied selection signal; and a data coupling means for coupling said header bit of said selected input data to said tail bit side of said feedback data and supplying the coupled data as said not yet output data to said data outputting means.

11. A data stream generation apparatus as set forth in claim 10, wherein said apparatus comprises a data length processing means for cumulatively adding data lengths of said input data based on said input data length information sequentially input corresponding to said input data and subtracting said predetermined data length from said cumulative data length when the cumulative data length reaches said predetermined data length, and said data output unit outputs the data of said predetermined data length when the cumulative data length of said data length processing means reaches said predetermined data length, while outputs said not yet output data as said feedback data when it does not reach said predetermined data length.

12. A data stream generation apparatus as set forth in claim 11, wherein said data adding means includes an adjustment data length setting means for setting an adjustment data length in accordance with the sum of the cumulative data length of said data length processing means and said input data length, an adjustment data generating means for generating said adjustment data in accordance with said set adjustment data length, and an adding means for adding said generated adjustment data to said header bit side of said control data.

13. A data stream generation apparatus as set forth in claim 12, wherein said adjustment data length setting means sets said adjustment data length in accordance with a difference between a quotient obtained by dividing the cumulative data length of said data length processing means by said unit data length and said unit data length.

14. A data stream generation apparatus as set forth in claim 12, wherein said adjustment data length setting means inverts bit values of lower significant data of a predetermined number of bits from the least significant bit in the binary value of the cumulative data length of said data length processing means and sets said adjustment data length in accordance with data obtained by adding a predetermined value to the bit inverted lower significant data.

15. A data stream generation apparatus as set forth in claim 12, wherein said adjustment data generating means selects one data from a plurality of predetermined data in accordance with said set adjustment data length and generates adjustment data in accordance with said selected data.

16. A data stream generation apparatus as set forth in claim 12, wherein said data generating means generates data in accordance with each bit value in the binary value of said set adjustment data length for each bit, selects one data from a plurality of data generated by coupling the generated data for each bit in a predetermined sequence in accordance with the bit value of at least one predetermined bit among the bits, and generates adjustment data in accordance with the selected data.

17. A data stream generation apparatus as set forth in claim 12, wherein said data selecting means selects sequentially input variable length data or said control data in accordance with said selection signal and supplying said selected input data to said data coupling means, and has a data length selecting means for selecting input data length information corresponding to said variable length data or control data to which said adjustment data has been added and supplying said selected input data length information to said data length processing means.

18. A data stream generation apparatus as set forth in claim 17, further comprising:

a variable length data coupling means for coupling a plurality of variable length data each having variable length and supplying the same to said data selecting means;

a first data length generating means for generating input data length information of said coupled variable length data based on the input data length information corresponding to the plurality of variable length data and supplying the same to said data length selecting means; and a second data length generating means for generating input data length information of control data to which said adjustment data has been added based on the set adjustment data length and supplying the same to said data length selecting means.

19. A data stream generation method for sequentially coupling predetermined header bits of sequentially input data to the tail bit side of previously input data and sequentially outputting data of the predetermined data length from said header bit side of said coupled data, said data stream generation method repeating the following steps:

a data outputting step of outputting said predetermined data length's worth of data from said header bit side of the not yet output data and generating feedback data in accordance with the data remaining after the output when the data length of the said coupled data which has not been output reaches said predetermined data length, or generating said feedback data in accordance with the not yet output data when the data length of said not yet output data does not reach said predetermined data length;

a data adding step of generating adjustment data having the data length of the difference between the data length of said feedback data and the data length of a whole multiple of a predetermined unit data length when said input data is predetermined data and adding the same to said tail bit side of the feedback data; and a data coupling step of coupling said header bit of said input data to said tail bit side of said feedback data and generating the not yet output data of said data output step.

20. A data stream generation method for sequentially coupling predetermined header bits of sequentially input data to the tail bit side of previously input data and sequentially outputting data of a predetermined data length from said header bit side of said coupled data, said data stream generation method repeating the following steps:

a data outputting step of outputting said predetermined data length's worth of the data from said header bit side of the not yet output data and generating feedback data in accordance with the data remaining after the output when the data length of said coupled data which has not been output reaches said predetermined data length and generating said feedback data in accordance with the not yet output data when the data length of said not yet output data does not reach said predetermined data length; and a data coupling step of generating adjustment data having a data length of a difference between a sum of data lengths of said input data and said feedback data and the data length of a whole multiple of a predetermined unit data length, adding the same to said header bit side of the input predetermined data, selecting predetermined data with said adjustment data added thereto or sequentially input variable length data in accordance with an input selection signal, and coupling said header bit of the selected data to said tail bit side of said feedback data.

21. A variable length encoded data stream generation apparatus for sequentially generating variable length encoded data or predetermined control data, sequentially coupling predetermined header bits of the generated data to the tail bit side of previously generated data, and sequentially outputting data of a predetermined data length from said header bit side of said coupled data, said variable length encoded data stream generation apparatus comprising:

a variable length encoding means for sequentially generating variable length encoded data obtained by compressing and encoding intended data or intended control data;

a data outputting means for outputting said predetermined data length's worth of data from said header bit side of the not yet output data and outputting data remaining after the output as feedback data when the data length of the said coupled data which has not been output reaches said predetermined data length, while outputting the not yet output data as said feedback data when the data length of said not yet output data does not reach said predetermined data length;

a data adding means for generating adjustment data having a data length of a difference between the data length of said feedback data and the data length of a whole multiple of a predetermined unit data length when the generated data of said variable length encoding means is said control data and adding the same to said tail bit side of the feedback data; and a data coupling means for coupling said header bit of the generated data of said variable length encoding means to said tail bit side of said feedback data and supplying the coupled data as said not yet output data to said data outputting means.

22. A variable length encoded data stream generation apparatus for sequentially generating variable length encoded data or predetermined control data, sequentially coupling predetermined header bits of the generated data to the tail bit side of the previously generated data, and sequentially outputting data of the predetermined data length from said header bit side of said coupled data, said variable length encoded data stream generation apparatus comprising:

a variable length encoding means for sequentially generating variable length encoded data obtained by compressing and encoding intended data or intended control data and outputting a selection signal in accordance with the generated data;

a data outputting means for outputting said predetermined data length's worth of data from said header bit side of the not yet output data and outputting data remaining after the output as feedback data when the data length of the said coupled data which has not been output reaches said predetermined data length, while outputting the not yet output data as said feedback data when the data length of said not yet output data does not reach said predetermined data length;

a data adding means for generating adjustment data having a data length of a difference between a sum of data lengths of said input data and said feedback data and the data length of a whole multiple of a predetermined unit data length and adding the same to said header bit side of said control data;

a data selecting means for selecting control data with said adjustment data added thereto or said variable length encoded data in accordance with said selection signal; and a data coupling means for coupling said header bit of the selected data of said data selecting means to said tail bit side of said feedback data and supplying the coupled data as said not yet output data to said data outputting means.

23. A variable length encoded data stream generation method for sequentially generating variable length encoded data or predetermined control data, sequentially coupling the predetermined header bits of the generated data to the tail bit side of the previously generated data, and sequentially outputting data of a predetermined data length from said header bit side of said coupled data, said variable length encoded data stream generation method repeating the following steps:

a variable length encoding step of sequentially generating variable length encoded data obtained by variable length encoding the intended data or intended control data;

a data outputting step of outputting said predetermined data length's worth of data from said header bit side of the not yet output data and generating feedback data in accordance with the data remaining after the output when the data length of the said coupled data which has not been output reaches said predetermined data length and generating said feedback data in accordance with the not yet output data when the data length of said not yet output data does not reach said predetermined data length;

a data adding step of generating adjustment data having a data length of a difference between the data length of said feedback data and the data length of a whole multiple of a predetermined unit data length when the generated data in said variable length encoding step is said control data and adding the same to said tail bit side of the feedback data; and a data coupling step of coupling said header bit of said generated data to said tail bit side of said feedback data and generating the not yet output data of said data output step.

24. A variable length encoded data stream generation method for sequentially generating variable length encoded data or predetermined control data, sequentially coupling predetermined header bits of the generated data to the tail bit side of the previously generated data, and sequentially outputting said predetermined data length' worth of data from said header bit side of said coupled data, said variable length encoded data stream generation method repeating the following steps:

a variable length encoding step of sequentially generating variable length encoded data obtained by variable length encoding the intended data or intended control data and generating a selection signal in accordance with the generated data;

a data outputting step of outputting said predetermined data length's worth of data from said header bit side of the not yet output data and generating feedback data in accordance with the data remaining after output when the data length of said coupled data which has not been output reaches said predetermined data length and generating said feedback data in accordance with the not yet output data when the data length of said not yet output data does not reach said predetermined data length; and a data coupling step of generating adjustment data having a data length of the difference between the sum of data lengths of said input data and said feedback data and the data length of a whole multiple of a predetermined unit data length and adding the same to said header bit side of said control data, selecting the control data with said adjustment data added thereto or sequentially input variable length data in accordance with said selection signal, and coupling said header bit of the selected data to said tail bit side of said feedback data.

25. A camera system for sequentially generating data obtained by variable length encoding image data or predetermined control data, sequentially coupling predetermined header bits of the generated data to the tail bit side of previously generated data, and sequentially outputting data of a predetermined data length from said header bit side of said coupled data, said camera system comprising:

an imaging means for imaging a desired image and generating image data;

a variable length encoding means for sequentially generating variable length encoded data obtained by variable length encoding said generated image data or desired control data; outputting data remaining after the output as feedback data when the data length of the said coupled data which has not been output reaches said predetermined data length, while outputting the not yet output data as said feedback data when the data length of said not yet output data does not reach said predetermined data length;

a data adding means for generating adjustment data having a data length of the difference between the data length of said feedback data and the data length of a whole multiple of a predetermined unit data length and adding the same to said tail bit side of the feedback data when the generated data of said variable length encoding means is said control data;

a data coupling means for coupling said header bit of the generated data of said variable length encoding means to said tail bit side of said feedback data and supplying the coupled data as said not yet output data to said data outputting means; and a processing means for performing predetermined processing with respect to the stream of said output image data.

26. A camera system for sequentially generating data obtained by variable length encoding image data or predetermined control data, sequentially coupling predetermined header bits of the generated data to the tail bit side of previously generated data, and sequentially outputting data of a predetermined data length from said header bit side of said coupled data, said camera system comprising:

an imaging means for imaging the desired image and generating image data;

a variable length encoding means for sequentially generating variable length encoded data obtained by variable length encoding said generated image data or intended control data and outputting a selection signal in accordance with the generated data;

a data outputting means for outputting said predetermined data length's worth of data as output image data from said header bit side of the not yet output data and outputting data remaining after the output as feedback data when the data length of said coupled data which has not been output reaches said predetermined data length, while outputting the not yet output data as said feedback data when the data length of said not yet output data does not reach said predetermined data length;

a data adding means for generating adjustment data having a data length of the difference between the sum of data lengths of said input data and said feedback data and the data length of a whole multiple of a predetermined unit data length and adding the same to said header bit side of said control data;

a data selecting means for selecting control data with said adjustment data added thereto or said variable length encoded data in accordance with said selection signal;

a data coupling means for coupling said header bit of the selected data of said data selecting means to said tail bit side of said feedback data and supplying the coupled data as said not yet output data to said data outputting means; and a processing means for performing predetermined processing with respect to the stream of said output image data.

* * * * *